United States Patent
Masiello et al.

(10) Patent No.: US 9,127,597 B2
(45) Date of Patent: Sep. 8, 2015

(54) SENSOR SYSTEM

(75) Inventors: Kathryn A. Masiello, Seattle, WA (US); Robert Steven Wright, Seattle, WA (US); Jeffrey Lynn Duce, Milton, WA (US); Bradley J. Mitchell, Snohomish, WA (US); Joseph A. Marshall, IV, Kent, WA (US)

(73) Assignee: The Boeing Company, Chicago, IL (US)

( * ) Notice: Subject to any disclaimer, the term of this patent is extended or adjusted under 35 U.S.C. 154(b) by 909 days.

(21) Appl. No.: 13/242,044

(22) Filed: Sep. 23, 2011

(65) Prior Publication Data
US 2013/0079955 A1 Mar. 28, 2013

(51) Int. Cl.
| | | |
|---|---|---|
| *G01C 23/00* | (2006.01) | |
| *F02C 9/28* | (2006.01) | |
| *G07C 5/08* | (2006.01) | |

(52) U.S. Cl.
CPC ............... *F02C 9/28* (2013.01); *F05D 2260/80* (2013.01); *G07C 5/0816* (2013.01); *Y02T 50/672* (2013.01)

(58) Field of Classification Search
CPC ...... B64D 45/0015; G01C 23/00; F02C 9/28; F05D 2260/80
USPC ........ 340/584, 945, 577; 701/3; 702/130, 182
See application file for complete search history.

(56) References Cited

U.S. PATENT DOCUMENTS

| | | | | |
|---|---|---|---|---|
| 4,114,442 A | * | 9/1978 | Pratt | 374/113 |
| 6,285,947 B1 | * | 9/2001 | Divljakovic et al. | 701/110 |
| 6,408,259 B1 | * | 6/2002 | Goebel et al. | 702/183 |
| 7,487,029 B2 | * | 2/2009 | Feeney et al. | 701/100 |
| 7,684,936 B2 | * | 3/2010 | Bechhoefer | 702/34 |
| 8,255,100 B2 | * | 8/2012 | Schimert | 701/14 |
| 8,473,176 B2 | * | 6/2013 | Youngquist et al. | 701/101 |
| 2005/0261820 A1 | * | 11/2005 | Feeney et al. | 701/100 |
| 2009/0153336 A1 | * | 6/2009 | Kates | 340/602 |
| 2009/0216393 A1 | * | 8/2009 | Schimert | 701/14 |
| 2009/0229272 A1 | * | 9/2009 | Feeney et al. | 60/778 |

OTHER PUBLICATIONS

Hariram, Sham et al., "Fire Protection: Engines and Auxiliary Power Units," Aero Quarterly 2010, http://www.boeing.com/commercial/aeromagazine/articles/2010_q4/3/.

* cited by examiner

*Primary Examiner* — Eric M Blount
(74) *Attorney, Agent, or Firm* — Baldauff IP, LLC; Michael J. Baldauff, Jr.

(57) ABSTRACT

Concepts and technologies are disclosed herein for a sensor system for detecting, characterizing, monitoring, and analyzing data. According to some embodiments disclosed herein, a monitoring system is configured to obtain data from a sensor system. The sensor system includes two or more sensors and can indicate an operating state detected at a monitored structure by the sensors. The monitoring system also obtains operational data including a threshold value for the sensors and an expected value for the sensors. The monitoring system is configured to adjust the thresholds based, at least partially, upon the operational data to obtain an adjusted threshold value, and to compare the data value to the adjusted threshold. The monitoring system can determine if the monitored structure is operating in an alarm condition.

35 Claims, 14 Drawing Sheets

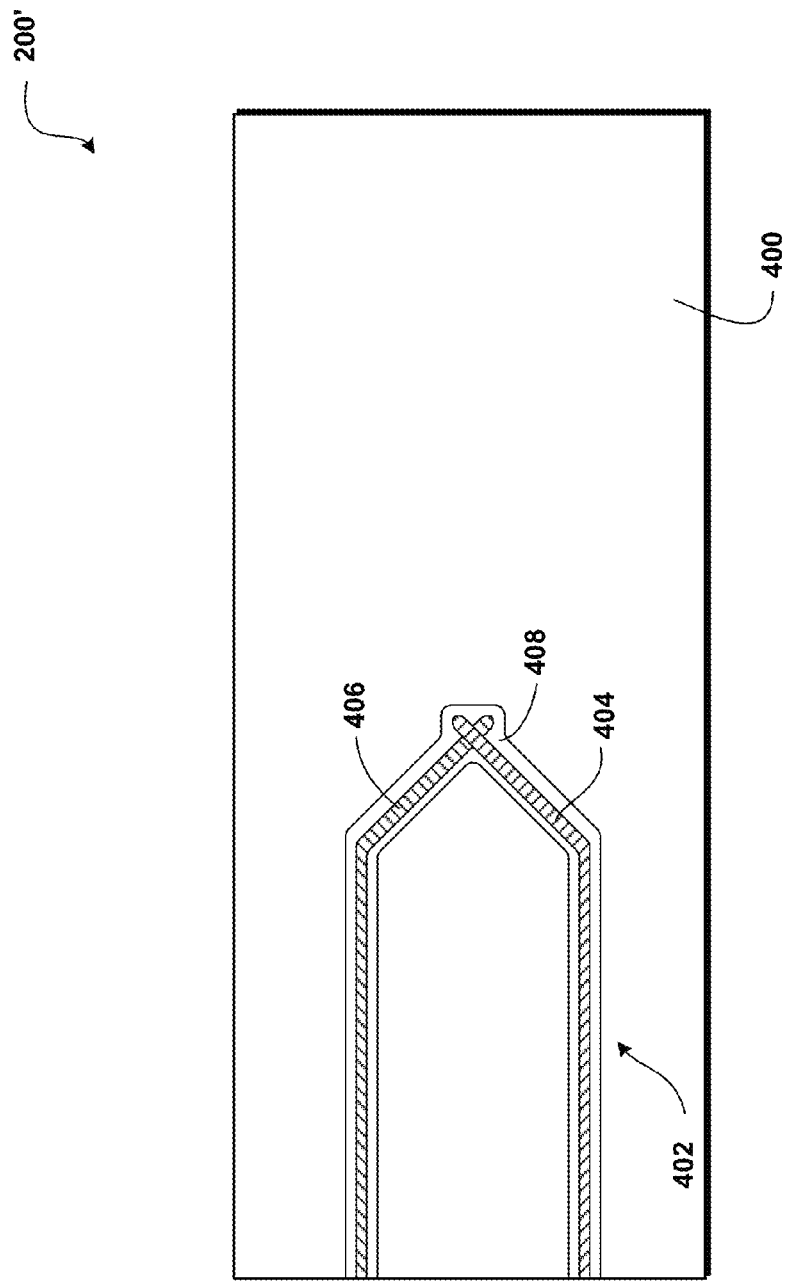

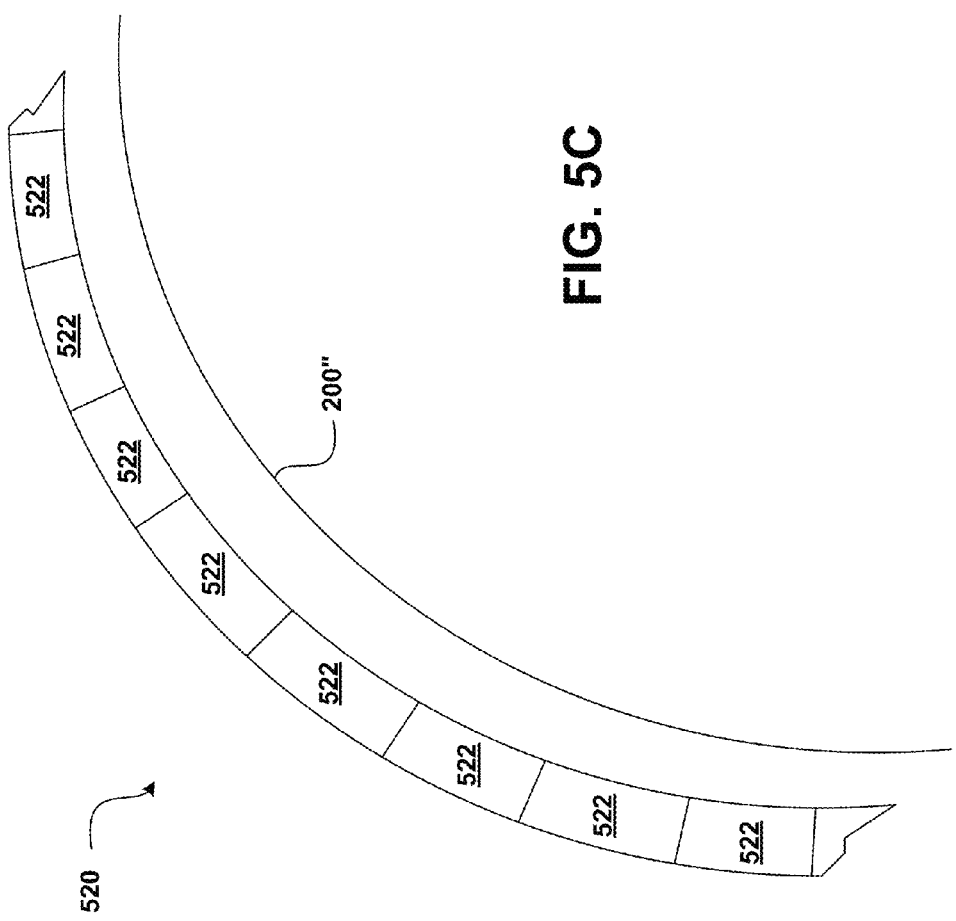

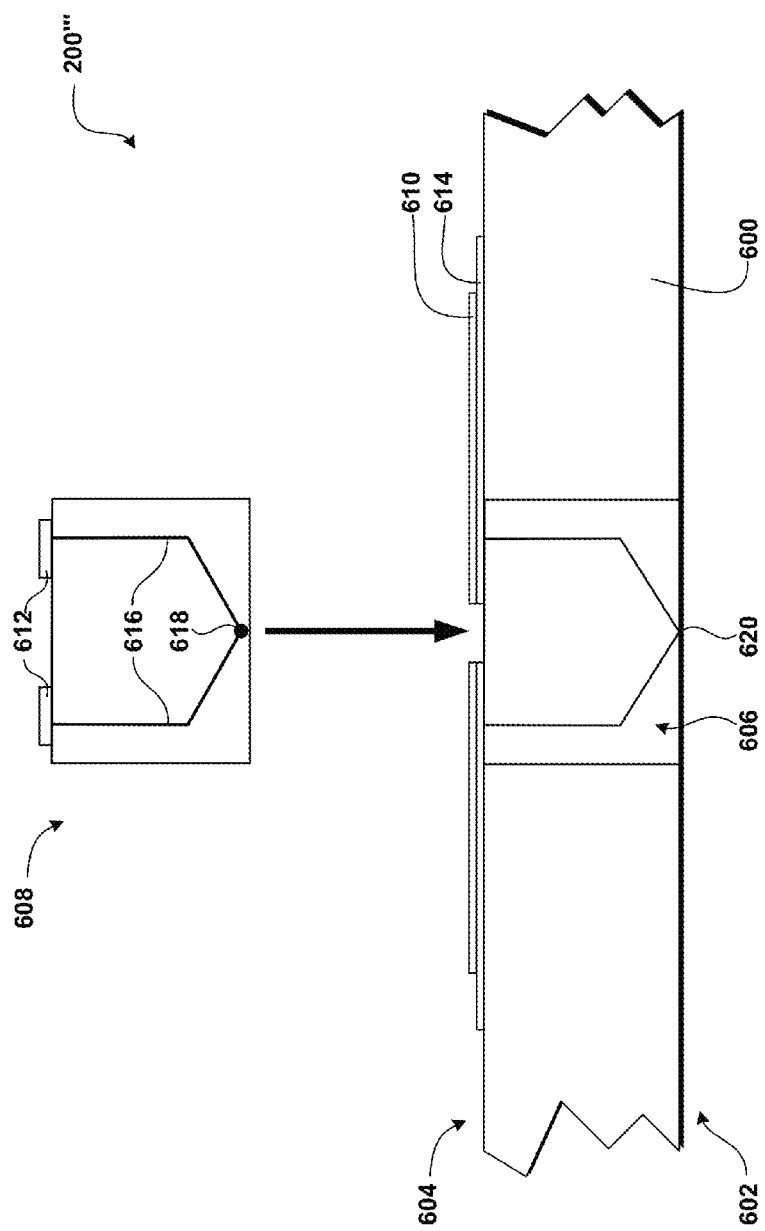

SENSOR SYSTEM

TECHNICAL FIELD

The present disclosure relates generally to sensors and, more particularly, to an integrated sensor system for detecting, characterizing, monitoring, and analyzing data.

BACKGROUND

In many vehicles, systems, and/or other devices, sensors are used to track various performance, operational, and/or status information. For example, some vehicles may include sensors for tracking fuel levels, temperature levels, outside temperatures, oil pressure values, and/or other information. Other systems or devices can include a number of sensors to track information for various purposes.

Civilian and military aircraft often include a host of sensors to track numerous types of data from numerous sources. These sensors include, but are not limited to, engine thrust levels, engine temperatures, altitude, airspeed, flap position, landing gear position, aileron position, location, orientation, other information, combinations thereof, and the like. As is known, operational information associated with aircraft in general, and aircraft propulsion systems in particular, is important to pilots, air crew, ground crews, and airlines. As used herein, an aircraft "propulsion system" can include, but is not necessarily limited to, an engine, one or more inlet nacelles, one or more exit nozzles, thrust reversers, struts, and/or other associated structures and/or devices.

One operation state sometimes tracked for aircraft propulsion systems is a propulsion system temperature, corresponding to a temperature of any portion of the propulsion system including part of, or the entire, undercowl environment. In some aircraft propulsion system temperature monitoring systems, one or more thermal devices are placed in or near one or more components of a propulsion system. A temperature detected by the thermal device is tracked and compared to a set threshold. If the detected temperature exceeds the threshold, an alarm or warning can be reported to an air crew or a ground crew. Some common thermal devices used in aircraft propulsion systems are linear devices that can measure anywhere from two to over twenty feet in length. As such, hot spots along the length of the thermal devices can be averaged out by other areas of the propulsion system.

These thermal devices have limitations, however. In particular, some overheat or fire conditions can be missed due to averaging out of temperatures along the thermal sensors. Additionally, locating high heat, overheat, or fire conditions can be difficult as the devices provide only one measurement for what may be an extended area of the monitored structure or device. Thus, troubleshooting propulsion systems or other structures after occurrence of an alarm condition or state can require teardown of the monitored device and/or guess work to determine a condition that led to the alarm or other actionable operation state. Additionally, current technologies do not allow any ability to adjust the alarm trigger points to account for changing operational conditions, such as external environment or operating demands on the monitored system.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the embodiments disclosed herein, a monitoring system is presented. The monitoring system is configured to execute computer executable instructions stored in a memory to obtain data from an integrated sensor system. The integrated sensor system includes two or more sensors, and the data can indicate an operating state detected at a monitored structure by at least one of the sensors. The monitoring system is further configured to obtain operational data including a threshold value for at least one of the sensors and an expected value for the at least one of the sensors. The monitoring system is configured to adjust the data based, at least partially, upon the operational data to obtain an adjusted data value, and to compare the adjusted data value to the threshold. Based upon the comparison, the monitoring system can determine if the monitored device, system, environment, or structure (herein referred to as "structure") is operating in an alarm condition. The monitoring system also makes it possible to use different alarm thresholds for different locations.

According to another aspect of the embodiments disclosed herein, a computer-implemented method for monitoring a structure is provided. The computer-implemented method includes computer-implemented operations for obtaining data at a monitoring system. The data can be obtained from at least one of the sensors and can indicate an operating state detected at a monitored structure by the sensors. In some embodiments, the sensors include a thermocouple. The method also can include obtaining operational data including a threshold value for at least one of the two or more sensors, adjusting the data based, at least partially, upon the operational data to obtain an adjusted data value, and comparing the adjusted data value to the threshold. The method also includes determining, based upon the comparing, if the monitored structure is operating in an alarm condition.

According to yet another aspect of the embodiments disclosed herein, a method for monitoring a structure is presented. The method can include computer-implemented operations for obtaining data at a monitoring system. The data can be obtained from at least one of two or more independently operating thermocouples, and can indicate temperatures detected at various locations on an aircraft propulsion system monitored by the thermocouples. The method can include obtaining operational data including a threshold value for each of the thermocouples, adjusting the data based, at least partially, upon the operational data to obtain an adjusted data value, and comparing the adjusted data value to the threshold. The method includes determining, based upon the comparing, if the aircraft propulsion system is operating in an alarm condition. The method also includes storing the data in a data storage device in communication with the monitoring system.

The features, functions, and advantages discussed herein can be achieved independently in various embodiments of the present invention or may be combined in yet other embodiments, further details of which can be seen with reference to the following description and drawings.

BRIEF DESCRIPTION OF THE DRAWINGS

FIG. 4A is a line diagram illustrating aspects of a sensor used in an integrated sensor system, according to one illustrative embodiment.

FIGS. 5C-5E are line diagrams illustrating additional aspects of the sensor depicted in FIG. 5A.

FIG. 6 is a line diagram illustrating aspects of a sensor used in an integrated sensor system, according to yet another illustrative embodiment.

DETAILED DESCRIPTION

Figure 1:
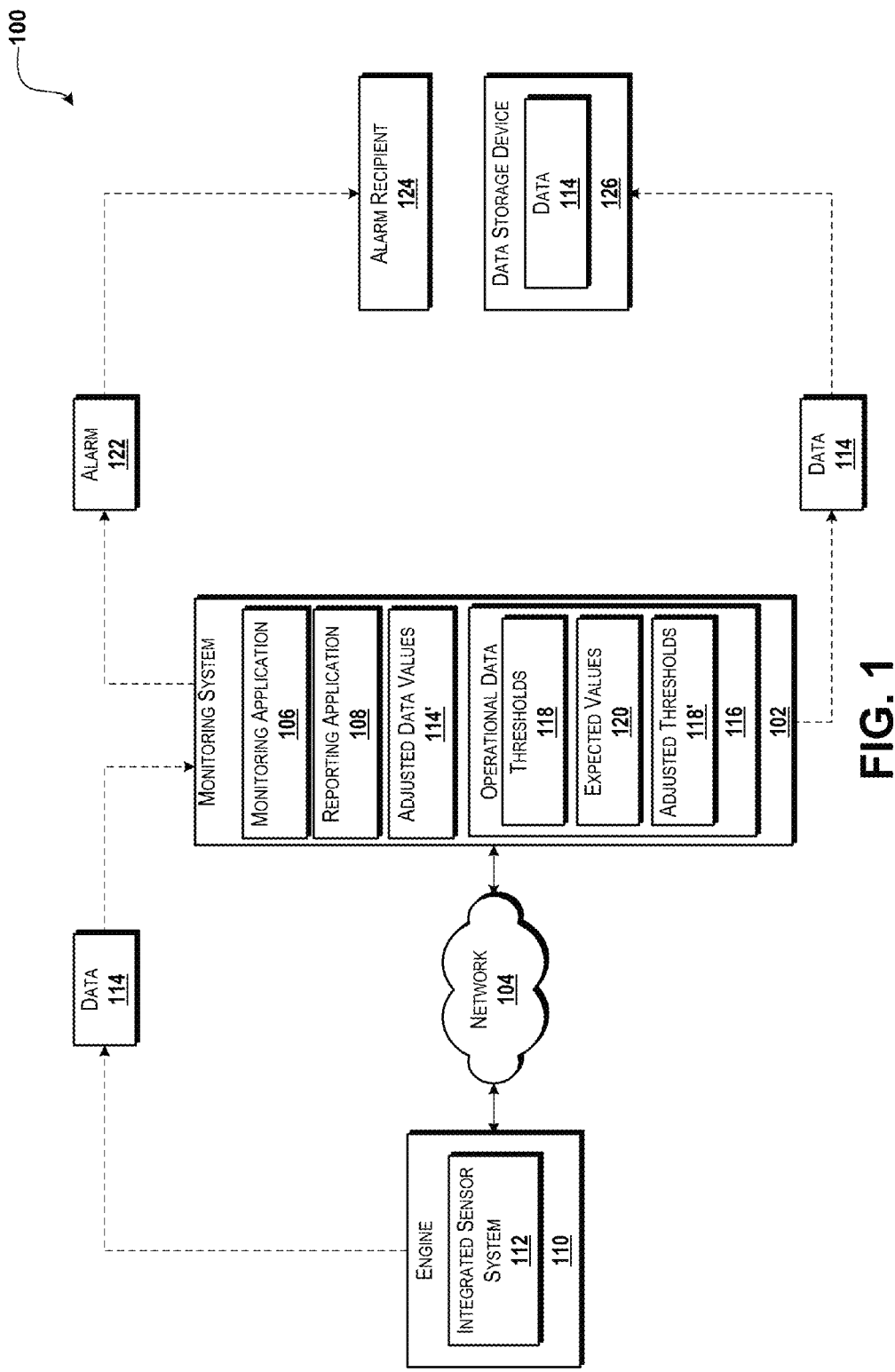
FIG. 1 is a system diagram showing an operating environment for various embodiments of the concepts and technologies disclosed herein.

The following detailed description is directed to an integrated sensor system for detecting, characterizing, monitoring, and analyzing data. According to the concepts and technologies disclosed herein, a monitoring system communicates with an integrated sensor system that can include a number of sensors for monitoring a structure or environment such as, for example, an aircraft engine, a propulsion system, an entire undercowl environment, or other system, device, structure, or environment. The sensors can generate data and transmit, or make available, the data to the monitoring system. The monitoring system can execute one or more application programs for monitoring the data generated by the sensors to determine if the structure is operating normally or abnormally. The monitoring system can also store threshold values that define alarm conditions as well as expected values that define various values expected at certain operating states such as ambient temperatures, thrust levels, flight phases, altitudes, and the like. The threshold values can be stored as an array of individual threshold values tailored to each sensor of the sensor system.

According to some implementations, the monitoring system is configured to use the operational data and other data obtained by various systems to adjust the data obtained by the sensors. The monitoring system can generate adjusted data values that adjust the actual data obtained by the sensors in accordance with expected differences based upon the ambient temperatures, thrust levels, and the like. These adjusted data values can be compared to the thresholds to determine if the monitored structure is operating normally or abnormally. In other embodiments, the monitoring system adjusts the thresholds to obtain adjusted thresholds and compares the adjusted thresholds to the data obtained by the sensors.

If the monitoring system determines that the monitored structure is not operating normally, the monitoring system can invoke reporting functionality to report an alarm to one or more entities. The monitoring system also can store the data obtained from the sensors for later analysis and/or troubleshooting. Thus, analysts can have access to actual sensor readings so that detailed analysis can be performed without relying upon generic alarm states and/or imprecise location information, as the sensors can have narrowly defined locations within the monitored structure. Analysts can also look at historical data over a number of flights, to observe trends that do not yet reach an alarm state, but may indicate an imminent failure that could then be prevented instead of being repaired. This can allow for predictive maintenance planning and/or to help provide efficient fleet management. As such, embodiments of the concepts and technologies disclosed herein can allow more detailed and easier troubleshooting than may be possible with existing monitoring devices and/or sensor systems. These and other advantages and features of the concepts and technologies disclosed herein will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

Referring now to FIG. 1, aspects of one operating environment 100 for the various embodiments presented herein will be described. The operating environment 100 shown in FIG. 1 corresponds, in various embodiments, to an aircraft or other vehicle, though the operating environment 100 can be embodied in other devices or systems. In the illustrated embodiment, the operating environment 100 includes a monitoring system 102. In some embodiments, the monitoring system 102 operates on or in communication with a network 104, though this is not necessarily the case. The functionality of the network 104 can be provided by one or more communication links, by one or more in-vehicle networks, by one or more wireless or wired connections, by one or more communications networks, and/or by other systems, connections, and/or devices.

According to various embodiments, the functionality of the monitoring system 102 is provided by an embedded control system such as an on-board computer, an aircraft avionics system, and/or other computing devices or systems. The functionality of the monitoring system 102 also can be provided by a personal computer ("PC") such as a desktop, tablet, or laptop computer system; a server computer; a handheld computer; and/or another computing device. Thus, while the functionality of the monitoring system 102 is described herein as being associated with or provided by an aircraft avionics system, it should be understood that this embodiment is illustrative, and should not be construed as being limiting in any way.

According to various embodiments, the monitoring system 102 is configured to execute an operating system (not illustrated) and one or more application programs such as, for example, a monitoring application 106, an alarming and reporting application ("reporting application") 108, and/or other application programs. The operating system is a computer program for controlling the operation of the monitoring system 102. The application programs are executable programs configured to execute on top of the operating system to provide functionality described herein for monitoring, detecting, and analyzing data obtained from one or more sensors, for reporting and/or recording information tracked or determined by the monitoring system 102, and/or for generating alarms and alerts for various entities.

According to various embodiments of the concepts and technologies disclosed herein, the monitoring system 102 communicates with and/or monitors one or more system such as, for example, an engine 110. In one contemplated embodiment, the monitoring system 102 communicates with and monitors one or more aircraft engines. Because the monitoring system 102 can monitor various systems or devices in addition to, or instead of, the illustrated engine 110, it should be understood that this embodiment is illustrative, and should not be construed as being limiting in any way.

The engine 110 can include, can be proximate to, can communicate with, and/or can be coupled to, an integrated sensor system 112. The integrated sensor system 112 is configured to generate data 114 indicating or representing one or more operating states or conditions of the engine 110. For example, the integrated sensor system 112 can correspond to one or more temperature sensors (not illustrated in FIG. 1) located at the engine 110. As such, the data 114 generated by the integrated sensor system 112 can correspond to one or more temperature measurements obtained by the integrated sensor system 112. Some contemplated embodiments of engines 110, sensors used to provide functionality associated with the integrated sensor system 112, and/or various illustrative embodiments of the integrated sensor system 112 are illustrated in more detail below with reference to FIGS. 2-7. Because the integrated sensor system 112 can be embodied within other structures and/or types of structures, it should be understood that the illustrated embodiments are illustrative, and should not be construed as being limiting in any way.

The monitoring application 106 is configured to obtain the data 114 from the integrated sensor system 112 and to analyze the data 114 to determine an operational state or condition associated with the engine 110. The determined operational state or condition can be used to determine if the engine 110 is operating normally or abnormally. The monitoring application 106 can make this determination based upon various data 114. For example, the data 114 obtained by the monitoring application 106 can include operational and/or environmental data associated with the monitored structure or system in addition to data obtained or generated by the integrated sensor system 112. As noted above, the monitoring system 102 is embodied, in some instances, within an aircraft. The operational and/or environmental data therefore can include various data associated with the aircraft such as, for example, data indicating a current flight phase, data indicating a thrust setting associated with one or more aircraft engines of the aircraft, historical performance or operational data associated with the aircraft and/or aircraft systems or components, data indicating an outside air temperature and/or other ambient conditions, combinations thereof, and the like. These data 114 can be obtained and analyzed by the monitoring application 106 in addition to, or instead of, the data obtained by the integrated sensor system 112.

The monitoring application 106 can be configured to compare the obtained data 114 to one or more known, expected, and/or historical operational data values ("operational data") 116. The operational data 116 can include, among other data, alarm threshold data ("thresholds") 118 for triggering alarm, warning, or alert conditions at the aircraft. The thresholds 118 can be set as absolute values. For example, a threshold 118 for temperature may be set at eight hundred degrees Fahrenheit or any other temperature. The thresholds 118 also can be set as deviations from normal or accepted values. For example, a threshold 118 for pressure can be set as twenty pounds per square inch increase per second. It should be understood that these examples are illustrative, and should not be construed as being limiting in any way. In particular, any appropriate values, rates, or ranges can be set and stored as the thresholds 118.

The operational data 116 also can include expected values 120. The expected values 120 can correspond to measurements or sensor readings expected to be observed at various operating states, ambient conditions, locations, orientations, flight phases, and/or based upon other conditions at the monitored structure or system. For example, the expected values 120 can include temperature or pressure values expected to exist at a particular thrust level, ambient temperature, flight phase, altitude, and/or under other conditions associated with an aircraft. The expected values 120 can be obtained via flight test data and analysis, manufacturer information, and/or other sources of information.

The expected values 120 can be used by the monitoring application 106 to adjust the thresholds 118. In particular, the monitoring application 106 can be configured to modify the thresholds 118 based upon the data 114. Thus, the monitoring application 106 can create adjusted threshold values ("adjusted thresholds") 118' that are based on the thresholds 118, but also take into account environmental or operational information that may affect the observed conditions at the integrated sensor system 112. As will be explained in more detail herein, the monitoring application 106 also can be configured to adjust the data 114 obtained from the integrated sensor system 112 to obtain adjusted data values 114' (also referred to herein as "adjusted data values"), and to compare the adjusted data values 114' to the thresholds 118 instead of, or in addition to, adjusting the thresholds 118. In other embodiments, the monitoring application 106 is configured to compare the data 114 obtained by the integrated sensor system 112 to the adjusted thresholds 118' to determine if a propulsion system is operating normally or abnormally.

Thus, various embodiments of the monitoring system 102 disclosed herein are configured not only to monitor and analyze the data 114 and/or to compare the data 114 to basic alarm thresholds such as the thresholds 118, but also to take a host of other data into account to generate the adjusted thresholds 118', and to compare the data 114 to the adjusted thresholds 118'. As such, various embodiments of the concepts and technologies disclosed herein provide alarming and/or alerting more accurately than may be possible by merely comparing the data 114 to basic alarm thresholds 118. The monitoring application 106 is configured to invoke or trigger the reporting application 108 to report or record the data 114 for various purposes. In some embodiments, for example, the monitoring application 106 invokes or triggers the reporting application 108 if the monitoring application 106 determines that the engine 110 is not operating normally, or if the monitoring application 106 determines that an alarm, alert, or warning state exists at the engine 110. In other embodiments, the reporting application 108 reports and/or records the data 114 even if the alarm, alert, or warning states do not exist at the engine 110.

The reporting application 108 can be configured to provide the functionality described herein for generating or detecting alarms, alerts, or warnings; reporting alarms, alerts, or warnings; recording the data 114 if alarms, alerts, or warnings are detected, recording the data 114 even if alarms, alerts, or warnings are not detected; and/or for providing other functionality disclosed herein. For purposes of simplifying the disclosure, the description refers to alarm states or conditions, though it should be understood that warnings states or other states associated with abnormal operation can be detected, reported, and/or can trigger storage of the data 114 and/or the adjusted data values 114'.

As noted above, the functionality of the reporting application 108 can be invoked or triggered by the monitoring application 106, though this is not necessarily the case. It should be understood that the functionality of the monitoring application 106 and the reporting application 108 can be provided by less than or more than two application programs, if desired. Similarly, while the monitoring application 106 and the reporting application 108 are illustrated herein as separate entities, this embodiment is illustrative and is described to simplify description of the concepts and technologies disclosed herein. As such, the illustrated embodiment should be understood as being illustrative, and should not be construed as being limiting in any way.

If the reporting application 108 determines or is informed that an alarm state exists at the engine 110, the reporting application 108 can generate an alarm 122. The reporting application 108 can transmit the alarm 122 to an alarm recipient 124. According to various implementations, the alarm recipient 124 includes, but is not limited to, a visual indicator such as a light, gauge, or other device; an audible indicator such as a siren, an alarm, or other audible device; one or more other systems for alerting personnel or flight systems of the alarm state; combinations thereof, and the like. The reporting application 108 also can transmit the alarm 122 to a remote alarm system such as, for example, a ground crew, a control tower, a remote monitoring device, other systems, devices, or entities, combinations thereof, and the like. Because the alarm 122 can be transmitted or provided to any suitable alarm recipient 124, it should be understood that the above-provided examples are illustrative, and should not be construed as being limiting in any way.

The reporting application 108 also can be configured to record the data 114 in a data storage device 126. The data 114 can be stored for various purposes. For example, the data 114 can be stored at the data storage device 126 and retrieved for detailed analysis and/or for other purposes by any authorized personnel. Thus, one or more entities can perform analysis of a state or states that triggered the alarm 122, or of the raw data 114 for maintenance planning, operational prognostic or other diagnostic purposes. Because the data 114 can be stored for any purpose, the above example should not be construed as being limited in any way.

According to various embodiments, the functionality of the data storage device 126 is provided one or more databases, server computers, desktop computers, mobile telephones, laptop computers, other computing systems, and the like. The functionality of the data storage device 126 also can be provided by one or more virtual machines and/or otherwise hosted by a cloud computing environment, if desired. In other embodiments, the functionality of the data storage device 126 is provided by one or more data storage devices associated with the monitoring system 102 such as, for example, a memory, a mass storage device, computer-readable storage media as defined herein, combinations thereof, and the like. In the described embodiments, the data storage device 126 is referred to as a local storage device located at or near the monitoring system 102. For example, the data storage device 126 can be a memory device associated with the monitoring system 102. It should be understood that this embodiment is illustrative, and should not be construed as being limiting in any way.

FIG. 1 illustrates one monitoring system 102, one network 104, one engine 110, one alarm recipient 124, and one data storage device 126. It should be understood, however, that some implementations of the operating environment 100 include or omit multiple monitoring systems 102, multiple networks 104, multiple engines 110, multiple alarm recipients 124, and/or multiple data storage devices 126. Thus, the illustrated embodiments should be understood as being illustrative, and should not be construed as being limiting in any way.

Figure 2:
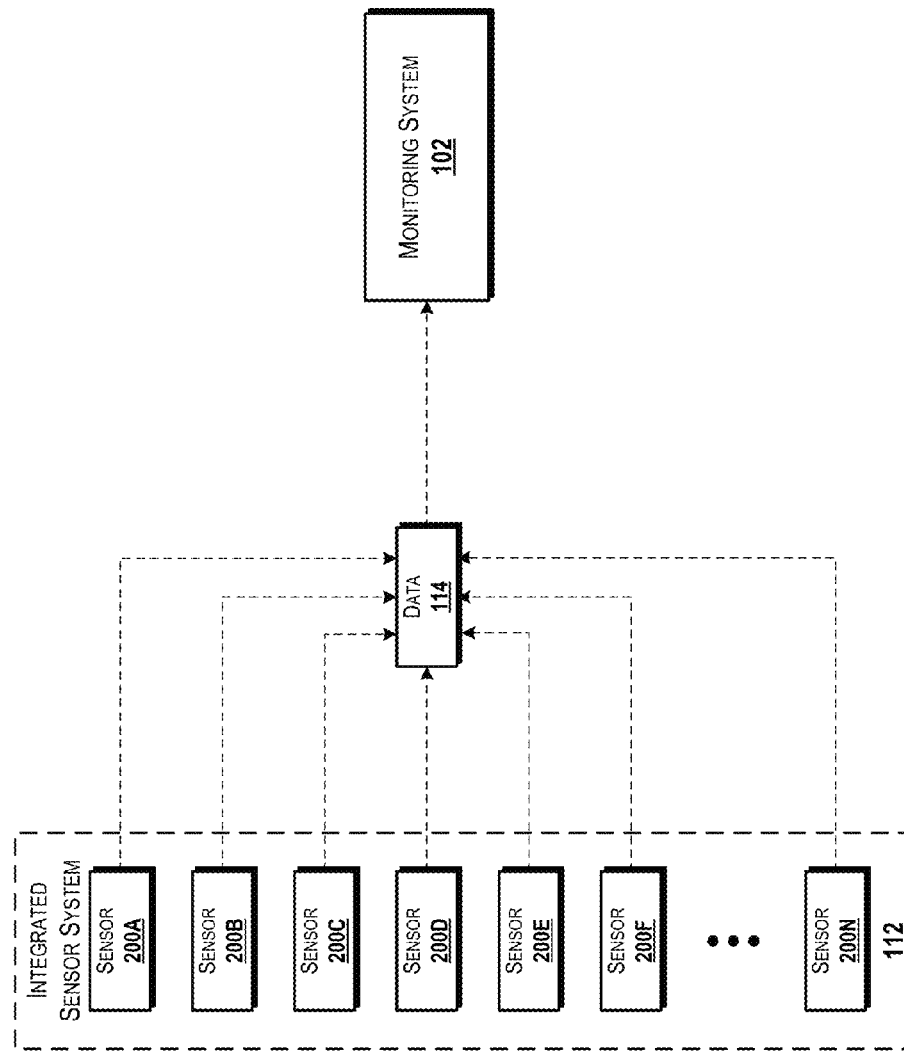
FIG. 2 is a block diagram illustrating aspects of an integrated sensor system, according to an illustrative embodiment.

Turning now to FIG. 2, an integrated sensor system 112 is shown, according to one illustrative embodiment. In FIG. 2, the integrated sensor system 112 is shown as including any number of sensors 200A-N (hereinafter collectively and/or generically referred to as sensors 200). It should be understood that the integrated sensor system 112 can include any number of sensors 200. Also, the sensors 200 can be physically or logically grouped together, if desired, though this is not necessarily the case. Some illustrative embodiments of the sensors 200 are illustrated and described below with reference to FIGS. 4A-6.

The integrated sensor system 112 can be integrated into, coupled to, and/or in communication with a monitored structure (not shown). As noted above, the monitored structure can include a vehicle, a system, a device, and/or various components thereof. As shown in FIG. 2, each of the sensors 200, or combinations of the sensors 200, can generate the data 114.

According to various embodiments, the data 114 generated by the sensors 200 is reported or provided to the monitoring system 102 in a batch or compiled format and/or as independent data streams, measurements, or packets. More particularly, in some implementations, the sensors 200 report the data 114 independently to the monitoring system 102 without averaging, batching, compiling, and/or otherwise assembling or de-localizing the measured data 114. For example, if ten sensors 200 are included in the integrated sensor system 112, the sensors 200 can provide ten streams, packets, or measurements as the data 114, and the data 114 generated by the respective sensors 200 can be provided to the monitoring system 102. For example, if the nine of the ten sensors 200 obtain measurements of one hundred degrees and one of the ten sensors 200 obtains a measurement of one thousand degrees, these ten values can be provided to the monitoring system 102 as the data 114. As such, the monitoring system 102 can detect and can act on the one thousand degree measurement, which may correspond to a fire condition or other condition that should trigger an alarm state or condition.

In some embodiments (not shown), however, the data 114 generated by the sensors 200 is batched and reported as an averaged or complied value. In the above example, the data 114 may be batched or compiled together, and the monitoring system 102 may therefore determine the average temperature across the sensors 200 as one hundred ninety degrees, corresponding to an average of the ten sensors 200. As noted above, the monitoring system therefore may or may not detect the one thousand degree reading. Though various benefits can be realized by some embodiments of the concepts and technologies disclosed herein by not batching the data 114 together, some embodiments may nonetheless compile or batch the data 114 together for other purposes. As such, the illustrated embodiments should be understood as being illustrative, and should not be construed as being limited in any way.

In the embodiments described herein, the sensors 200 are independently and/or individually configured to report the data 114 to the monitoring system 102. In other embodiments, the integrated sensor system 112 reports the data 114 to the monitoring system 102. Thus, the monitoring system 102 can receive data 114 obtained by the sensor 200A, for example, and not merely a compiled data file associated with the sensors 200. It should be understood that this embodiment is illustrative, and should not be construed as being limiting in any way.

Figure 3:
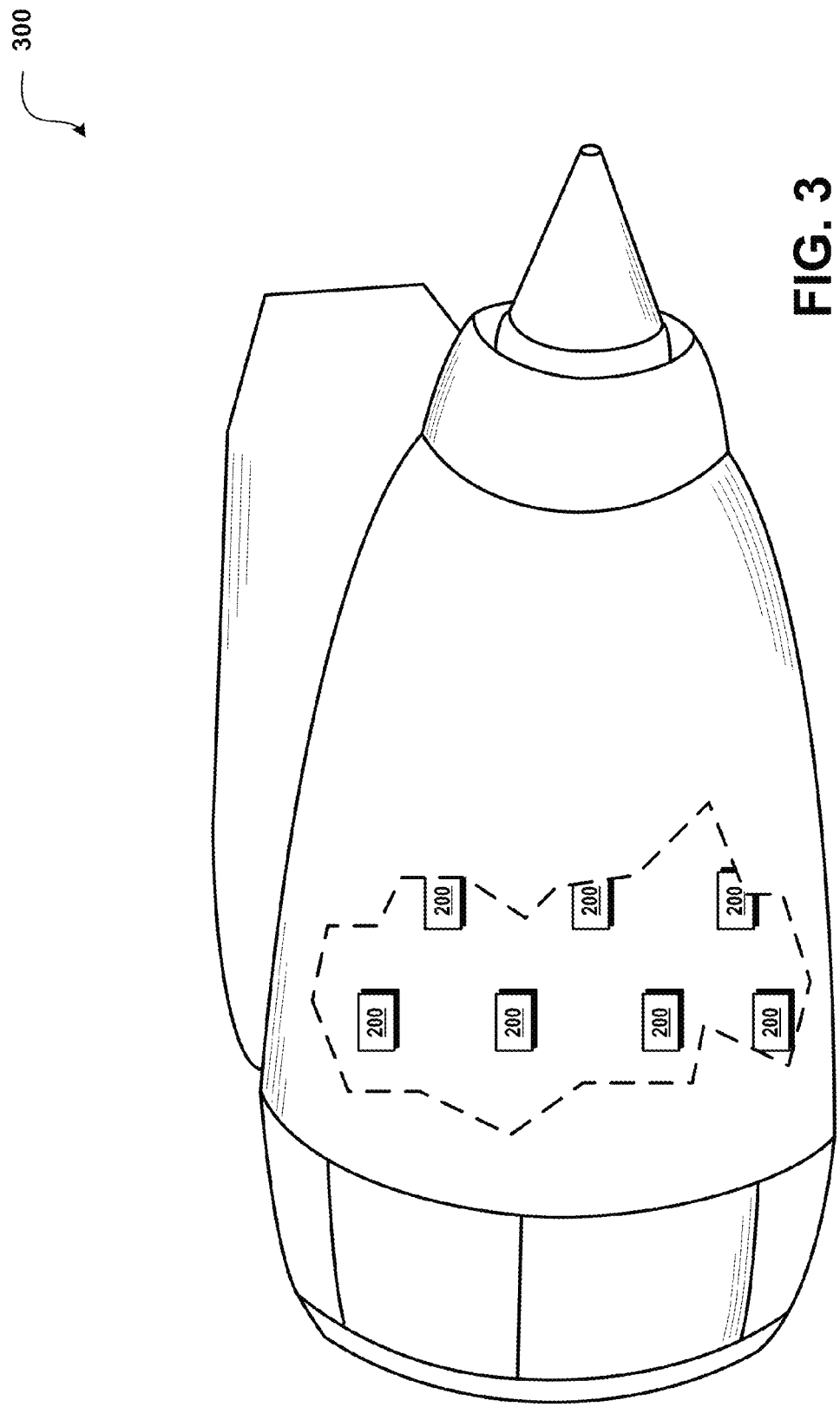
FIG. 3 is a line diagram schematically illustrating an integrated sensor system integrated into an aircraft propulsion system, according to an illustrative embodiment.

Turning now to FIG. 3, an implementation of the integrated sensor system 112 is shown, according to an illustrative embodiment. In FIG. 3, the sensors 200 are shown disposed into, on, or within an aircraft propulsion package consisting of an engine, aerodynamic cowling (nacelle) and mounting strut ("aircraft propulsion system") 300. Although not visible in FIG. 3, it should be understood that a density with which the sensors 200 are distributed throughout and/or around the aircraft propulsion system 300 can be varied. In particular, a relatively high density of sensors 200 can be placed in areas where relatively high temperatures are expected to provide a high-resolution measurement capability. Similarly, a relatively low density of sensors 200 can be placed in areas where relatively lower temperatures are expected. In some embodiments, an area where relatively high temperatures are expected includes the turbine case of the aircraft propulsion system 300, and an area where relatively low temperatures are expected includes the fan compartment of the aircraft propulsion system 300. It should be understood that this embodiment is illustrative, and should not be construed as being limiting in any way.

As noted above, the integrated sensor system 112 and/or the sensors 200 can be embodied in other devices, environments, or structures instead of, or in addition to, the aircraft propulsion system 300. As such, the illustrated embodiment should be understood as being illustrative and should not be construed as being limited in any way. Because aircraft structures are generally understood in the art, the various structures of the illustrated aircraft propulsion system 300 are not described herein in additional detail.

The sensors 200 can be disposed adjacent to, proximate to, and/or integrated within the various structures of the aircraft propulsion system 300. For example, the sensors 200 can be built into the walls of the aircraft propulsion system 300, disposed at various points within the aircraft propulsion system 300 such as at or near intakes, at or near nozzles, and/or at other locations that may be determined by personnel designing, servicing, and/or building the aircraft propulsion system 300, by personnel retrofitting the aircraft propulsion system 300 with the capabilities described herein with regard to the integrated sensor system 112 and/or the monitoring system 102, and/or by any other entities. As such, the illustrated locations of the sensors 200 should be understood as being illustrative, and should not be construed as being limited in any way.

The sensors 200 can include any suitable sensor devices and/or combinations of sensor devices. For example, in some embodiments the sensors 200 include one or more photo sensors, optical sensors, thermal sensors, pressure sensors, and/or combinations thereof. Several illustrative embodiments for the sensors 200 are set forth and described in detail below with reference to FIGS. 4A-6B. Because any type of suitable sensors 200 can be used in various embodiments of the concepts and technologies disclosed herein, the various embodiments of the sensors 200 provided herein should be understood as being illustrative, and should not be construed as being limiting in any way.

Turning now to FIG. 4A, additional aspects of the sensors 200 are shown in detail, according to one illustrative embodiment. In particular, FIG. 4A is a line diagram illustrating aspects of a sensor 200' according to one illustrative embodiment. The sensor 200' shown in FIG. 4A is configured for use in measuring temperature, though this embodiment is illustrative. The sensor 200' includes a substrate 400. The substrate 400 can include an engine component, a stand-alone carrier ribbon or other substrate, or any other structure suitable for carrying a thermocouple 402 or other element. In the illustrated embodiment, the substrate 400 is provided by titanium coupon. It should be understood that this embodiment is illustrative, and should not be construed as being limiting in any way.

The thermocouple 402 can include, as is known, a combination of materials for measuring a voltage generated by heat at or around the thermocouple 402. The thermocouple 402 can include, but is not limited to, a first trace 404 formed from a first material and a second trace 406 formed from a second material. The first trace 404 and the second trace 406 can meet or be arranged proximate to one another to facilitate electron transfer between the first and second materials. More particularly, as is known, heat can cause an electron transfer from the first material to the second material, and the resulting voltage can be measured to determine a temperature at or near the thermocouple 402.

The thermocouple 402 can be sprayed, printed, or otherwise deposited on the substrate 400 via any suitable process including, for example, using plasma flame spray, atomized jetted deposition, screen printing, ink jetting, and/or other processes. In some embodiments, the first trace 404 and the second trace 406 form a junction. In the illustrated embodiment, a dielectric trace 408 is provided to separate the electrically conductive thermocouple traces 404 and 406 from the electrically conductive substrate 400. In some embodiments, separating the electrically conductive thermocouple traces 404, 406 from the electrically conductive substrate 400 can help prevent electrical shorting between these elements. In some embodiments, the dielectric trace 408 may be omitted, for example, if the substrate 400 is not electrically conductive.

The dielectric trace 408 may be formed from a ceramic material such as spinel or other suitable material, though this embodiment is illustrative and should not be construed as being limited in any way. Similarly, in the illustrated embodiment, the first trace 404 and/or the second trace 406 are configured as type-N thermocouples, though this embodiment is illustrative. Although not shown in FIG. 4A, it should be understood that the thermocouple 402 can include additional traces or paths to one or more interfacing connectors for redundancy, as is shown in more detail in FIG. 4B.

In some embodiments, the thermocouple 402 is printed onto or otherwise located at a hot side of an engine component or other structure. For example, the thermocouple 402 can be printed onto an inside surface of an aircraft engine before, during, or after assembly of the aircraft engine. In one implementation, the thermocouple 402 is printed onto an inside surface of a composite honeycomb face sheet of an aircraft engine. It should be understood that these embodiments are illustrative, and should not be construed as being limiting in any way.

In some embodiments, the thermocouple 402 is printed onto or otherwise located at a cold side of an engine. For example, the thermocouple 402 can be printed onto an outside surface of an engine component. If the thermocouple 402 is disposed at an outside or cold side of an engine, the temperature measured by the thermocouple 402 can be used to estimate a temperature on a hot side or the inside of the component using one or more mathematical formulae or algorithms. In one embodiment, the thermocouple 402 is printed onto an outside surface of a honeycomb face sheet, and a mathematical algorithm is used to estimate a temperature on the hot side of the component. It should be understood that this embodiment is illustrative, and should not be construed as being limiting in any way.

In some embodiments, an anemometer or other device also can be printed on the cold side of the engine or other component to further compensate for convective heat transfer on the cold side of the component. As such, it can be appreciated that a thermocouple 402 as disclosed herein can be printed onto or located at a hot side or cold side of an engine or component and/or that various structures and/or devices can be used to determine or estimate temperatures at the engine or other component based upon data obtained from or by the thermocouple 402. Because the thermocouple 402 can be substituted by other types of circuitry or sensors, and because the thermocouple 402 can be used in other structures, it should be understood that the various embodiments discussed above are illustrative, and should not be construed as being limiting in any way.

Figure 4B:
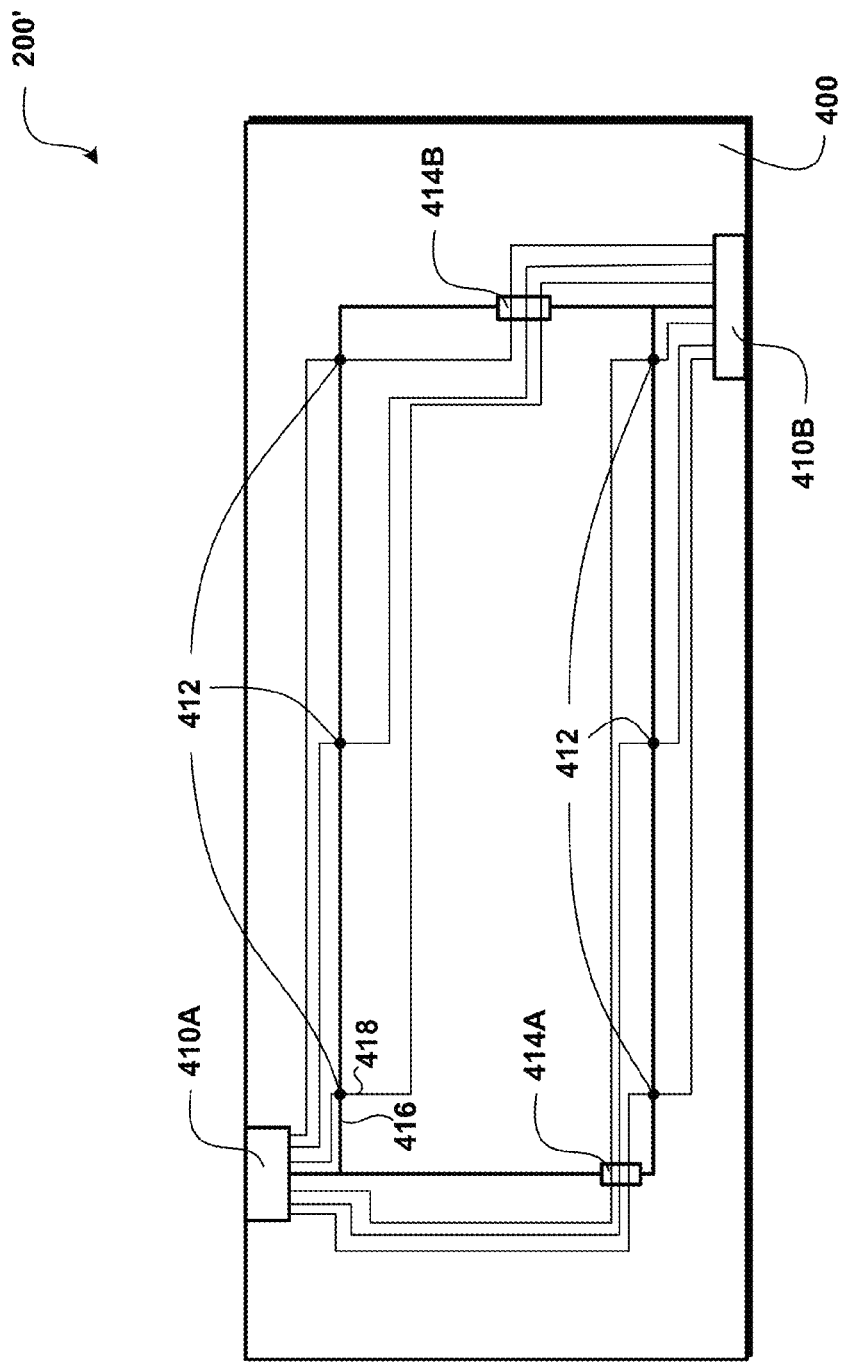
FIG. 4B is a circuit diagram illustrating additional aspects of the sensor depicted in FIG. 4A.

FIG. 4B is a circuit diagram illustrating additional aspects of the sensor 200' depicted in FIG. 4A. As shown in FIG. 4B, the sensor 200' can include a substrate 400, which can include various materials and/or structures as explained above with reference to FIG. 4A. The sensor 200' also can include one or more connectors 410A-B (hereinafter collectively and/or generically referred to as "connectors 410"). The sensor 200' can be connected, can communicate with, and/or can be coupled to any number of devices such as, for example, the monitoring system 102, via the connectors 410.

The sensor 200' includes, in the illustrated embodiment, six thermocouple junctions 412 and two dielectric patches 414A-B (hereinafter collectively and/or generically referred to as "dielectric patches 414"). It should be understood that if the substrate 400 is conductive, dielectric traces can be included under any traces and/or in between traces instead of, or in addition to, the illustrated dielectric patches 414. A shown in FIG. 4B, a first trace 416 formed from a first thermocouple material can contact a second trace 418 formed a second thermocouple material at one of the junctions 412. The dielectric patches 414 can be provided to insulate the traces 416, 418 and/or other equivalent or redundant traces from one another at locations other than the junctions 412, if desired. As mentioned above, if the substrate 400 is conductive, a dielectric trace or dielectric layer can be disposed between the traces 416, 418 and the substrate 400 in addition to the dielectric patches 414. In the illustrated embodiment, one trace 416 and six traces 418 are included in addition to the six junctions 412 to provide the sensor 200' with redundancy. This arrangement allows the multiple thermocouple junctions 412 to each be read at either of the connectors 414 while also allowing their respective traces to generally be widely spaced apart for protection from physical threats to the traces. While the illustrated sensor 200' includes six thermocouple junctions 412, one trace 416 and six traces 418, it should be understood that this embodiment is illustrative, and should not be construed as being limiting in any way.

Figure 5A:
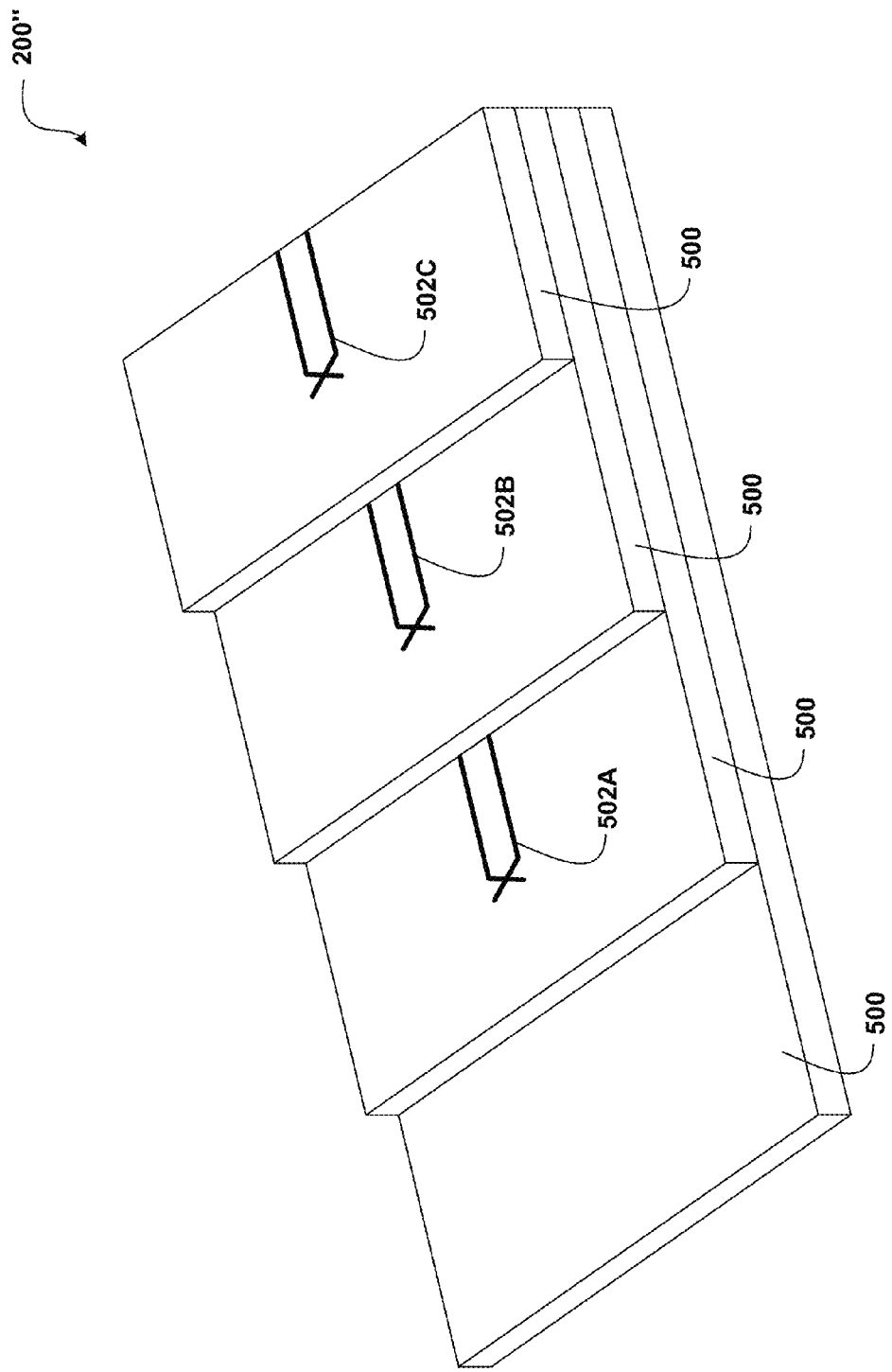
FIG. 5A is a line diagram illustrating aspects of a sensor used in an integrated sensor system, according to another illustrative embodiment.

Turning now to FIG. 5A, additional aspects of the sensors 200 are shown in detail, according to one illustrative embodiment. In particular, FIG. 5A is a line diagram illustrating aspects of a sensor 200", according to another illustrative embodiment. The sensor 200" shown in FIG. 5A is configured for use in measuring temperature, though this embodiment is illustrative. The sensor 200" includes a substrate 500. The substrate 500 can include an engine component, a stand-alone carrier ribbon or other substrate, or any other structure suitable for carrying one or more thermocouples 502A-C (hereinafter referred to generically or collectively as "thermocouples 502"). The substrate 500 can be formed from any suitable material including, but not limited to, metals, polymers, and/or other materials.

In the illustrated embodiment, the substrate 500 is provided by a flexible material that allows bending and/or form-fitting of the sensor 200". Thus, the sensor 200" can be attached to curved or irregularly-shaped surfaces and/or located on or in various structures. According to various embodiments, the substrate 500 can be mechanically attached to a structure using any suitable attachment methods including, but not limited to, adhesive bonding, metallic welding or brazing, plastic welding, ultrasonic welding, laser welding, mechanical fasteners, and/or other suitable processes and/or devices.

Each of the thermocouples 502 or other devices can be printed onto flexible substrates and arranged in a stacked relation, as shown in FIG. 5A. Note that when the substrates 500 is electrically conductive, the thermocouples 502 may be electrically isolated from the substrate by depositing a dielectric material, not show, such as Spinel between the thermocouples 502 and substrates 500. As such, the sensor 200" can include a number of substrates 500, though this is not necessarily the case. Various implementations of the sensor 200" are illustrated and described in more detail below, particularly with reference to FIGS. 5C-5E. The sensor 200" can include one or more thermocouples 502 and/or a combination of various sensors or devices, if desired. Thus, the sensor 200" can include multiple devices to provide redundancy and/or to provide various combinations of functionality. It should be understood that this embodiment is illustrative, and should not be construed as being limiting in any way.

Figure 5B:
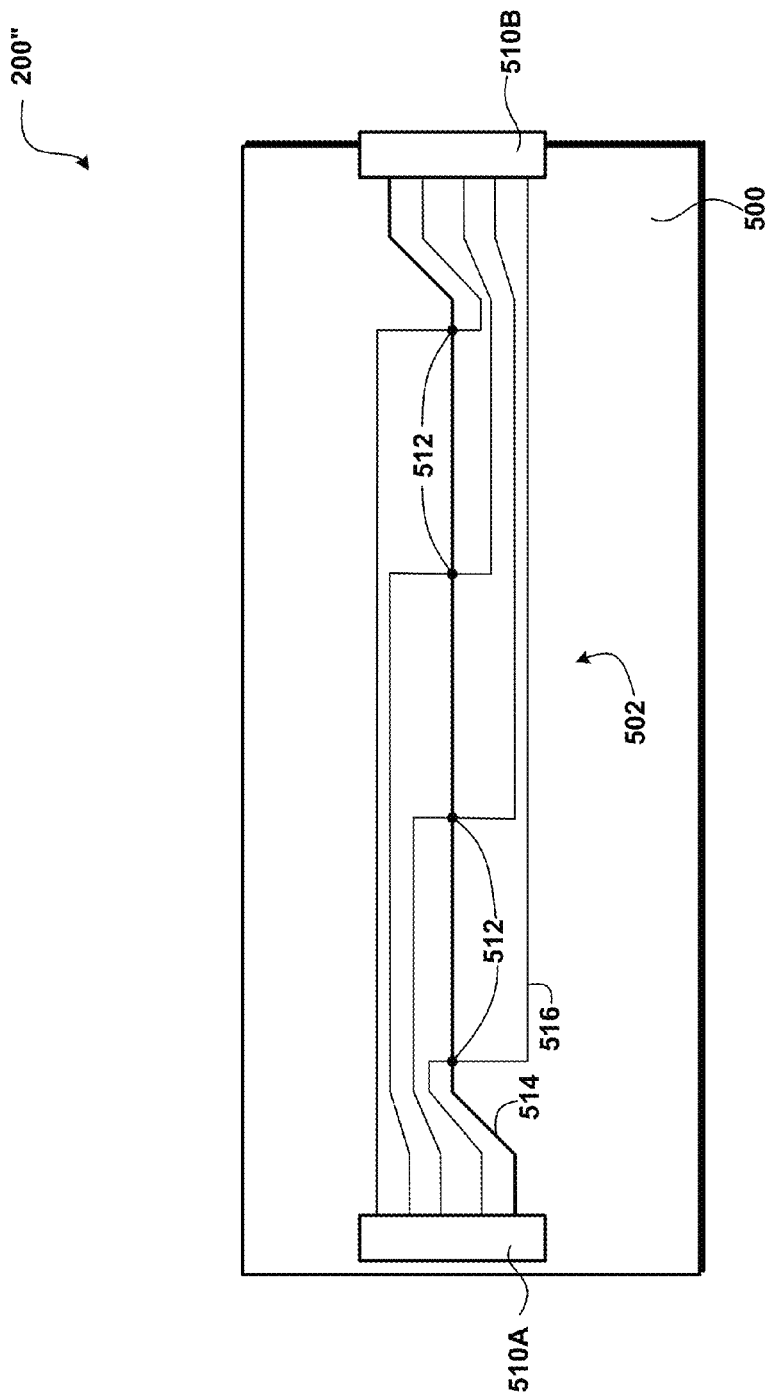
FIG. 5B is a circuit diagram illustrating additional aspects of the sensor depicted in FIG. 5A.

FIG. 5B is a circuit diagram illustrating additional aspects of the sensor 200" depicted in FIG. 5A, according to one embodiment. As shown, a sensor 200" can include a substrate 500, which can include a flexible or inflexible material, if desired. The sensor 200" can include one or more connectors 510A-B (hereinafter collectively and/or generically referred to as "connectors 510"). The sensor 200" can be connected to one or more devices such as, for example, the monitoring system 102, via the one or more connectors 510.

The sensor 200" can include, as is known, circuitry corresponding to one or more thermocouples 502, as discussed above. The thermocouples 502 can include a combination of materials for measuring voltage generated by heat at or around the thermocouple 502. For example, the thermocouple 502 can include a number of thermocouple junctions 512. The thermocouple 502 also can include, but is not limited to, a first trace 514 formed from a first thermocouple material and at least one second trace 516 formed from a second thermocouple material. As shown in FIG. 5B, the sensor 200" can include a number of traces formed from the second thermocouple material including, but not limited to, the second trace 516.

The first trace 514 and the second trace 516 can meet or be arranged proximate to one another at one or more of the junctions 512. As is known, heat can cause an electron transfer from the first trace 514 to the second trace 516, and the resulting voltage can be measured at or from one or more of the connectors 510 to determine a temperature at or near the thermocouple 502. It can be appreciated from the view shown in FIG. 5B that dielectric patches such as the dielectric patches 414 shown in FIG. 4B can be omitted in some embodiments of the sensor 200", though this is not necessarily the case. The thermocouple 502 can be printed on the substrate 500 via any suitable process including, for example, using plasma flame spray, atomized jetted disposition, and/or other processes, as noted above.

FIG. 5C is a line diagram illustrating additional aspects of the sensor 200" depicted in FIG. 5A. In particular, FIG. 5C shows an illustrative implementation of the sensor 200" into an aircraft engine or other structure, according to one illustrative embodiment. As shown in FIG. 5C, the sensor 200" can be attached onto a curved or irregularly shaped structure such as, for example, an engine component 520. In the illustrated embodiment, the engine component 520 includes a number of cellular structures ("cells") 522, though this is not necessarily the case. As such, it can be appreciated from the arrangement illustrated in FIG. 5C that the sensor 200" can be attached to a number of cells 522.

While the arrangement illustrated in FIG. 5C corresponds to an arrangement in which the sensor 200" is attached to an inside surface of the engine component 520, it should be understood that this is not necessarily the case. In particular, as noted above and illustrated and described in additional detail below, the sensor 200" can be attached to the outside of the engine component 520, if desired. As such, it should be understood that the illustrated embodiment is illustrative, and should not be construed as being limiting in any way. The sensor 200" can be attached to the engine component 520 and/or the cells 522 using any suitable processes or materials.

Figure 5D:
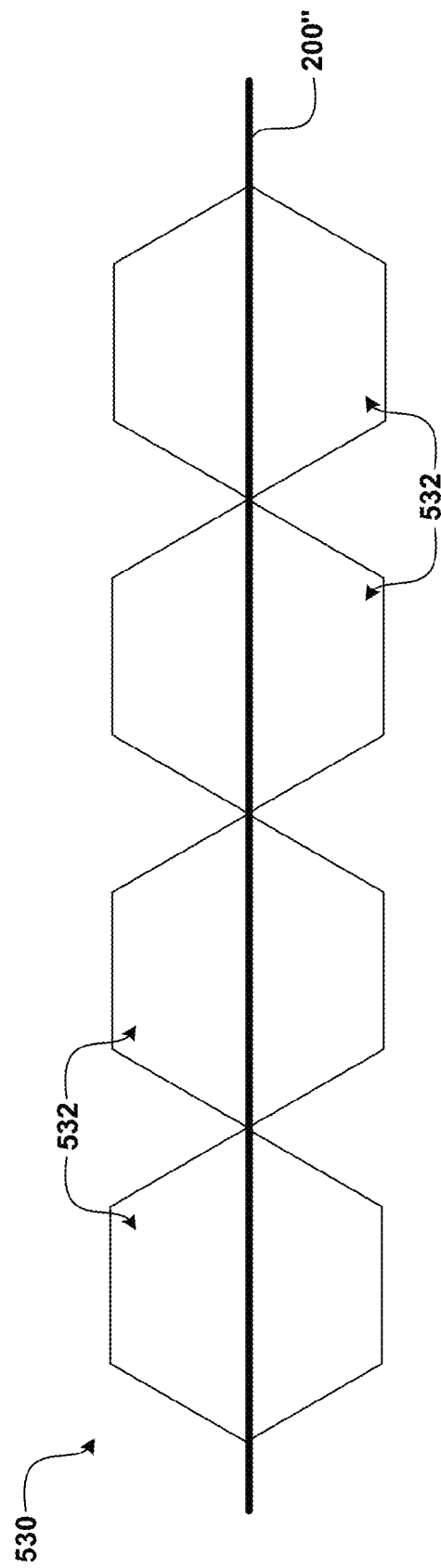

Turning now to FIG. 5D, additional aspects of the sensors 200 are described in detail. In particular, FIG. 5D is a line diagram illustrating additional aspects of the sensor 200" depicted in FIG. 5A, according to another illustrative embodiment. FIG. 5D shows an illustrative implementation of the sensor 200" into an aircraft engine, a wall, a car engine, or another structure, according to one illustrative embodiment. As shown in FIG. 5D, the sensor 200" can be attached onto an irregularly shaped structure such as, for example, an engine component of an aircraft engine formed from a honeycomb panel 530.

In the illustrated embodiment, the honeycomb panel 530 includes a number of hexagonally-profiled cellular structures ("hex cells") 532, though this is not necessarily the case. In the illustrated embodiment, the sensor 200" is disposed or used as a septum between two honeycomb core ribbons that can be assembled together to form the hex cells 532 and/or the honeycomb panel 530. In various embodiments, the sensor 200" is located at an edge of the honeycomb panel 530 proximate to a hot side of an engine or other structure. It should be understood that this embodiment is illustrative, and should not be construed as being limiting in any way.

Figure 5E:
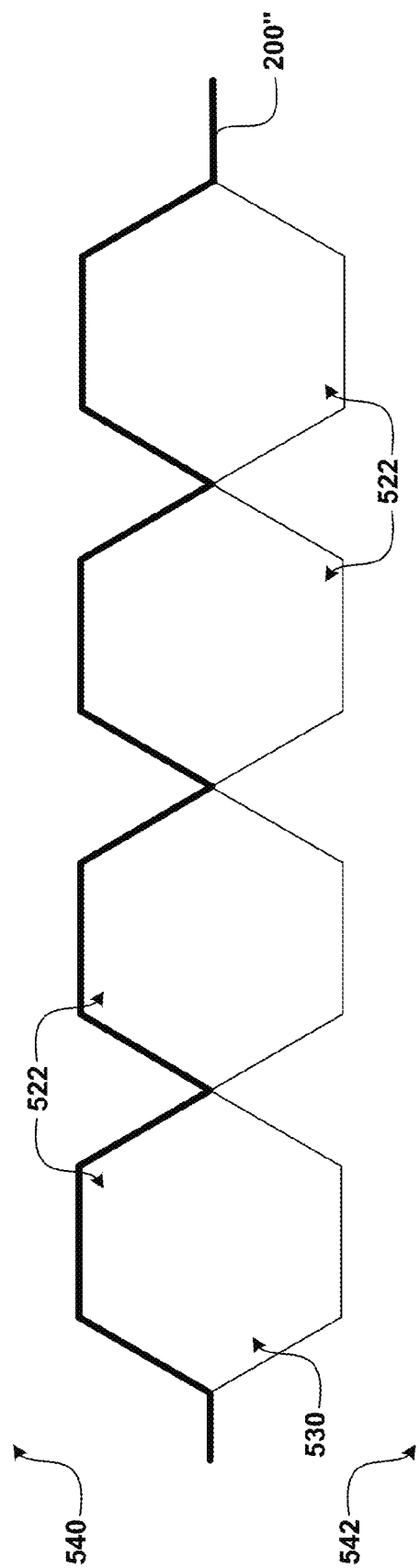

Turning now to FIG. 5E, additional aspects of the sensors 200 are illustrated in more detail. In particular, FIG. 5E is a line diagram illustrating additional aspects of the sensor 200" depicted in FIG. 5A, according to yet another illustrative embodiment. FIG. 5E shows another illustrative implementation of the sensor 200" implemented into an aircraft engine, a wall, a car engine, or another structure that includes, for example, the honeycomb panel 530 illustrated in FIG. 5D. As shown in FIG. 5E, the sensor 200" can be attached onto the hex cells 532 of the honeycomb panel 530.

In the embodiment illustrated in FIG. 5E, the sensor 200" is attached to a hot side 540 of the honeycomb panel 530, though this is not necessarily the case. In various embodiments, the sensor 200" is located a cold side 542 of the honeycomb panel 530 in addition to, or instead of, the illustrated arrangement. As such, it should be understood that the embodiment shown in FIG. 5E is illustrative, and should not be construed as being limiting in any way.

Turning now to FIG. 6, additional aspects of the sensors 200 are shown in detail, according to one illustrative embodiment. In particular, FIG. 6 is a line diagram illustrating aspects of a sensor 200''' according to one illustrative embodiment. As shown in FIG. 6, the sensor 200''' can be implemented within an engine or other structure 600. In the illustrated embodiment, the structure 600 corresponds to an aircraft engine panel, though it should be understood that this embodiment is illustrative.

The structure 600 includes, in some embodiments, a hot side, indicated generally at 602, and a cold side, indicated generally at 604. The hot side 602 can correspond, for example, to an inlet-side or nozzle-side of an aircraft engine component such as the structure 600, to a combustion chamber side of the component 600, and/or to other hot or high temperature environments, wherein hot or high temperature is measured in absolute terms and/or in relative terms as being hot or high temperature relative to the cold side 604. It should be understood that these embodiments are illustrative, and should not be construed as being limiting in any way.

The structure 600 includes, in some embodiments, a panel insert cavity ("insert cavity") 606 into which a panel insert 608 is inserted from the cold side 604 such that the panel insert 608, and/or a portion thereof, is in close proximity to the hot side 602. It should be understood that the panel insert 608 can be inserted from the hot side 602, if desired. As such, the illustrated embodiments should be understood as being illustrative, and should not be construed as being limited in any way.

In various embodiments, a signal trace 610 can be disposed at or near the insert cavity 606. The signal trace 610, or a portion thereof, can contact one or more electrical contact pads 612 located at the panel insert 608. In some embodiments, one or more dielectric traces 614 can be located proximate to the signal trace 610 to insulate, or at least limit conductivity of, the signal trace 610. In embodiments that incorporate thermocouples, the use of the dielectric may, but are not necessarily, useful in enhancing the functionality of the sensor 200''', as is generally understood.

The panel insert 608 also can include one or more thermocouple materials 616 that can be configured to meet at a thermocouple junction 618 that is to be located at/or near a measurement point 620 within the structure 600. With the panel insert 608 located within the insert cavity 606, the temperature at or near the measurement point 620 at the hot side 602 of the structure 600 can be measured via signals measured at the cold side 604 of the structure 600. It should be understood that this embodiment is illustrative, and should not be construed as being limiting in any way. While the above discussion of FIGS. 4A-6 has referred to thermocouples as being included within the sensors 200, 200', 200", 200''', it should be understood that thermistors, optical sensors, and/or other sensors can be substituted for, or as, the described thermocouples.

Figure 7:
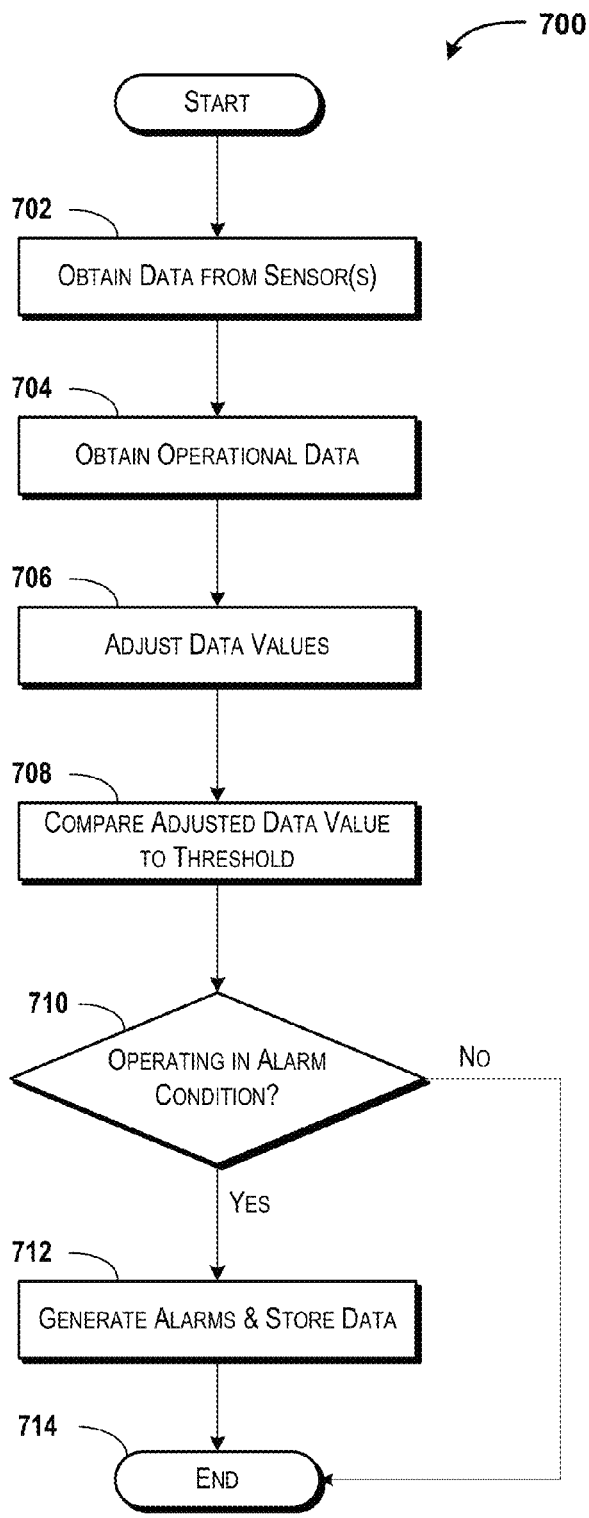
FIG. 7 is a flow diagram illustrating aspects of a method for detecting, monitoring, analyzing, and acting on data obtained with an integrated sensor system, according to an illustrative embodiment.

Turning now to FIG. 7, aspects of a method 700 for detecting, monitoring, analyzing, and acting on data obtained with an integrated sensor system as disclosed herein will be described in detail, according to an illustrative embodiment. It should be understood that the operations of the method 700 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 700 can be ended at any time and need not be performed in its entirety. Some or all operations of the method 700, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 700 is described as being performed by the monitoring system 102 via execution of the monitoring application 106 and/or the reporting application 108. It should be understood that these embodiments are illustrative, and should not be viewed as being limiting in any way. In particular, it should be understood that any suitable device can be configured to provide the functionality disclosed herein via execution of any suitable programs or modules.

The method 700 begins at operation 702, wherein the monitoring system 102 obtains data 114 from one or more of the sensors 200, 200', 200", 200''' and/or the integrated sensor system 112. As discussed above, the sensors 200, 200', 200", 200''' and/or the integrated sensor system 112 can include any type of sensing devices. In various contemplated embodiments, the sensors 200, 200', 200", 200''' and/or the integrated sensor system 112 include or are provided by one or more thermocouples, thermistors, and/or other devices, as well as various sensors or systems associated with the monitored system such as an avionics system of an aircraft or other devices or systems.

For purposes of describing the various embodiments of the concepts and technologies disclosed herein, the data 114 obtained in operation 702 is described as being obtained from one or more aircraft systems and by one or more sensors 200, 200', 200", 200'''. In particular, the data 114 obtained in operation 702 is described herein as being obtained by the monitoring system 102 from one or more aircraft system sensors and/or monitors and by one or more thermocouple devices such as the sensors 200, 200', 200", 200'''. Thus, the data 114 obtained in operation 702 can include a temperature monitored or measured by the one or more sensors 200, 200', 200", 200''' and/or the integrated sensor system 112, values corresponding to an ambient temperature or operating temperature measured at or near the aircraft, a thrust level associated with the monitored engine, and/or other data. It should be understood that this embodiment is illustrative, and should not be construed as being limiting in any way.

The data 114 obtained from the sensors 200, 200', 200", 200''', the integrated sensor system 112, and/or other devices can be obtained at the monitoring system 102 via direct connections, via networked connections, via communications links, and/or via other devices or links. Thus, the data 114 can correspond to analog or digital signals generated by or interpreted by the sensors 200, 200', 200", 200''', the integrated sensor system 112, other devices or systems, and/or the monitoring system 102, according to various implementations.

From operation 702, the method 700 proceeds to operation 704, wherein the monitoring system 102 obtains the operational data 116. The operational data 116 can include, but is not limited to, one or more thresholds 118, one or more expected values 120 that are associated with a structure, system, or device monitored by the sensors 200, 200', 200", 200''' and/or the integrated sensor system 112, and/or historical information or data, and/or current operating characteristics such as altitude, thrust command, airspeed or Mach number. As explained herein in more detail, the thresholds 118 and/or the expected values 120 can be stored as an array, with an individual value being associated with each sensor location. These embodiments support analysis of temperatures seen across propulsion systems or other devices, structures, or environments that can experience a wide range of normal or below-threshold operating temperatures. For purposes of describing the various embodiments of the concepts and technologies disclosed herein, the operational data 116 obtained in operation 704 is described herein as corresponding to at least one threshold 118 such as a temperature threshold associated with the monitored structure, and one or more expected values associated with the sensors 200, 200', 200", 200''' and/or the integrated sensor system 112. Again, it should be understood that multiple thresholds 118 are stored, wherein each of the thresholds 118 can be associated with a particular sensor, sensor location, and/or other aspects of the integrated sensor system 112. It should be understood that these embodiments are illustrative, and should not be construed as being limiting in any way.

From operation 704, the method 700 proceeds to operation 706, wherein the monitoring system 102 adjusts the one or more thresholds 118 obtained in operation 704 to obtain an adjusted threshold 118'. As noted above, the monitoring system 102 also can generate adjusted data values 114' instead of generating the adjusted thresholds 118'. As explained above, the adjusted data values 114' and/or the adjusted thresholds 118' can be based upon the data 114, the thresholds 118, and/or the operational data 116. In some embodiments, the monitoring system 102 adjusts the data 114 and/or the thresholds 118 to obtain the adjusted data values 114' or the adjusted thresholds 118' by applying an adjustment formula or algorithm to the data 114 and/or the operational data 116.

For example, the operational data 116 obtained in operation 702 can include a generic sensor temperature matrix that includes an expected sensor value at each sensor location, test values based upon test analysis of the monitored structure in various operating conditions, and/or various statistical values such as standard deviations to account for differences between various monitored structures such as engines. According to one embodiment, the operation data 116 includes outside air temperature adjustments that account for relationships between expected temperatures and known outside air temperatures, thrust adjustment that account for relationships between engine thrust and expected engine temperatures, and/or additional or alternative data.

According to one embodiment, the adjustment made in operation 706 includes a single outside air temperature adjustment that is made to any number of expected temperature values based upon the outside air temperature, a thrust adjustment factor calculated as (a maximum thrust of an engine minus a minimum thrust of the engine), divided by (a maximum temperature of the engine minus the minimum temperature of the engine), and/or other adjustments. In some embodiments, the thrust adjustment factor is calculated at sea level. The thrust adjustment factor can be calculated in a number of ways and can be stored in a matrix providing a value for each sensor location, if desired. As such, the above examples are illustrative and should not be construed as being limited in any way.

In one example, the generic sensor temperatures used to make the adjustment in operation 706 are developed at cruise level, based upon the assumption that cruise level corresponds to a level at which aircraft spend the majority of their operational flight time. A maximum cruise thrust ("MCT") can be set based upon a nominal cruise condition at thirty-five thousand feet on a standard temperature day. The outside air temperature adjustment can be calculated as a difference between current measured conditions as reported by an aircraft air data system, for example, and a reference condition such as the generic sensor temperature noted above. In particular, a standard temperature at thirty-five thousand feet is negative sixty three degrees Fahrenheit. Thus, if an air data system of an aircraft reports an outside air temperature of negative forty three degrees Fahrenheit, the outside air temperature adjustment would be plus twenty degrees for all sensors, i.e., the sensor reading at any of the sensors 200, 200', 200", 200''' can be expected to be twenty degrees above normal due to the outside air adjustment calculated above. It should be understood that this embodiment is illustrative, and should not be construed as being limiting in any way.

Similarly, a thrust adjustment as explained herein is calculated, in one example, based upon an assumption that temperature at any of the sensors will rise by a reference amount as thrust exceeds an expected thrust. In particular, temperature can be expected to rise as thrust of an engine exceeds a reference thrust, and expected to decrease as thrust of an engine is decreased below a reference thrust. The thrust adjustment ("TA") can be calculated as a percentage of maximum temperature rise proportional to the thrust command. One example of this calculation was briefly described above. In various implementations, a unique thrust adjustment is calculated for each sensor or sensor location, as each location within an engine may experience relatively more or less temperature rise compared to other sensors based upon thrust. Thus, the thrust adjustment can be stored in the operational data 116 as a matrix, if desired. In some embodiments, the thrust adjustment matrix has the same dimensions as an expected generic temperature matrix, though this is not necessarily the case.

In one sample scenario, the maximum thrust for an engine is one hundred percent and the minimum thrust is zero percent. A reference thrust is sixty percent. A temperature at the maximum thrust, determined by tests or other means, is four hundred degrees Fahrenheit and the temperature at the minimum thrust is two hundred degrees Fahrenheit. As such, the thrust difference is calculated as (one hundred minus zero)=one hundred percent and the temperature difference is calculated as (four hundred minus two hundred)=two hundred degrees Fahrenheit. As such, the thrust adjustment in this scenario would be two degrees Fahrenheit for each percent of thrust applied. As such, the thrust adjustment for a particular condition would be calculated as [(Commanded Thrust−Reference Thrust) times Adjustment Factor]. Thus, at sixty percent thrust−the reference "generic" condition−the adjustment would be [(sixty percent−sixty percent) times two degrees/percent)]=Zero. At reference condition there is no adjustment. An above reference condition, at seventy five percent thrust would yield [(seventy five minus sixty) times two]=30 degrees. A below reference condition would yield a negative adjustment, for example [(fifty percent minus sixty percent) times two]=negative 20 degrees. As noted above, the thrust adjustment can be different for each sensor 200, 200', 200", 200'''. It should be understood that this embodiment is illustrative, and should not be construed as being limiting in any way.

In a second sample scenario, the same basic reference temperatures and thrust adjustments used in the first example are assumed. In the second scenario, however, the aircraft is climbing through fifteen thousand feet at climb thrust (about seventy five percent of maximum) and the ambient temperature is positive fifteen degrees Fahrenheit. In this example, the temperature adjustment is (positive fifteen degrees minus negative sixty three degrees)=positive seventy eight degrees. As such, all readings at the sensors 200, 200', 200", 200''' are to be adjusted by subtracting seventy eight degrees reflecting the seventy eight degrees above nominal currently being experienced at the sensors 200, 200', 200", 200''' the thrust adjustment, per the example above is [(seventy five percent minus sixty percent) times two degrees]=thirty degrees. Assuming two sensors 200 capture temperature readings of three hundred fifty five degrees Fahrenheit and three hundred fifty seven degrees Fahrenheit, respectively, and assuming that generic un-adjusted temperatures for these two sensors 200 are, respectively, two hundred sixty two degrees Fahrenheit and two hundred sixty eight degrees Fahrenheit, the sample calculations of operation 706 would be (three hundred fifty five minus (two hundred sixty two plus seventy eight plus thirty degrees)=negative fifteen degrees Fahrenheit) and (three hundred fifty seven degrees minus (two hundred sixty eight plus seventy eight degrees plus thirty degrees)=negative nineteen degrees Fahrenheit). As will be appreciated below, both of these determinations are negative, and therefore would likely not trigger an alarm, alert, or warning condition. Such conditions can be considered to tend to indicate that the propulsion system is operating at lower-than-expected temperatures, whereas alarms may be configured to be triggered at one hundred or more degrees above expected temperatures. It should be understood that this embodiment is illustrative, and should not be construed as being limiting in any way.

From operation 706, the method 700 proceeds to operation 708, wherein the monitoring system 102 compares the data 114 obtained in operation 702 to the adjusted threshold 118' calculated in operation 706. In other embodiments, as explained above, the monitoring system 102 compares adjusted data values 114' to the thresholds 118. More particularly, a sensor reading obtained with the sensors 200, 200', 200", 200''' and/or the integrated sensor system 112 can be compared to the adjusted threshold 118' calculated in operation 706 to determine if a difference exists between the expected threshold 118' the measured value, or an adjusted data value 114' calculated in operation 706 can be compared to a threshold 118 to determine if the difference exists.

In some embodiments, the comparison done in operation 706 is done by taking a generic sensor temperature associated with a sensor 200, 200', 200", 200''' and/or the integrated sensor system 112, applying the outside air temperature adjustment and the thrust adjustment to the generic sensor temperature for the sensor 200, 200', 200", 200''' and/or the integrated sensor system 112, and comparing the value obtained to the measurement obtained from the sensor sensors 200, 200', 200", 200''' and/or the integrated sensor system 112 in operation 702. If the difference is positive, then the obtained data 114 or adjusted data value 114' exceeds an expected value such as a threshold 118 or an adjusted threshold 118', while if the difference is negative, the obtained data 114 or adjusted data value 114' does not exceed the expected value.

In some embodiments, positive differences above a predetermined threshold can be understood as corresponding to a reportable condition, though this is not necessarily the case. For example, in some embodiments a difference of one hundred degrees Fahrenheit above an expected value is determined by the monitoring system 102 as corresponding to an overheat condition, while differences of two hundred fifty degrees Fahrenheit above an expected value is determined by the monitoring system 102 as corresponding to a fire condition or other alarm condition. Meanwhile, differences of less than one hundred degrees and two hundred fifty degrees, respectively, can be determined not to correspond to overheat and/or fire conditions. Other values, as well as ranges, deviations, rates, or other relationships can be established as overheat, alarm, or other actionable or alarmable conditions. It should be understood that a designer or other entity could specify as many, or as few, thresholds as desired. As such, it should be understood that these embodiments are illustrative, and should not be construed as being limiting in any way.

From operation 708, the method 700 proceeds to operation 710, wherein the monitoring system 102 determines if the difference calculated in operation 708 corresponds to a normal or abnormal operation state and/or if the monitored structure is operating in an alarm condition. As noted above, if the difference calculated in operation 708 exceeds an expected value, or if the difference calculated in operation 708 exceeds an expected value by a predetermined amount, the monitoring system 102 can determine that the monitored structure is operating abnormally or in an alarm state or condition. It should be understood that this embodiment is illustrative, and should not be construed as being limiting in any way.

If the monitoring system 102 determines, at operation 710, that the monitored structure is operating abnormally or in an alarm state or condition, the method 700 proceeds to operation 712. At operation 712, the monitoring system 102 generates one or more alarms 122 and/or stores the data 114 obtained in operation 702 at a data storage location such as the data storage device 126. As explained above, the data 114 can be stored to allow analysis of the data 114 by various entities for troubleshooting or other purposes. As such, the data storage described herein can be performed at any time and/or at all times with or without the detection of an alarm condition, as explained above with reference to FIG. 1. As such, the illustrated embodiment should be understood as being illustrative, and should not be construed as being limited in any way.

According to various implementations, the data 114 stored in operation 712 includes actual temperature readings or other actual sensor readings. As such, instead of merely receiving information from a flight crew or other entities indicating that an overheat or fire condition was detected in a particular structure, analysts can review actual spatially-relevant, localized sensor readings and/or data that triggered alarm conditions. Because the monitoring system 102 tracks and/or stores data associated with a number of sensors and/or locations, and because the monitoring system 102 tracks actual sensor readings associated with those sensors and/or locations, analysts can be able to quickly identify the location of the problem and the exact condition or reading that triggered the alarm or warning. Thus, some embodiments of the concepts and technologies disclosed herein can provide an improvement over other sensors and/or monitoring devices that monitor sensors that cover large areas within monitored structures and/or that may or may not be configured to provide actual readings that can be stored and/or retrieved by analysts during troubleshooting or other analysis. As such, embodiments of the concepts and technologies disclosed herein can be used to improve troubleshooting of structures associated with alarm conditions, though this is not necessarily the case.

From operation 712, or if the monitoring system 102 determines, in operation 710, that the monitored structure is operating normally and/or not operating in an alarm state or condition, the method 700 proceeds to operation 714. The method 700 ends at operation 714.

Figure 8:
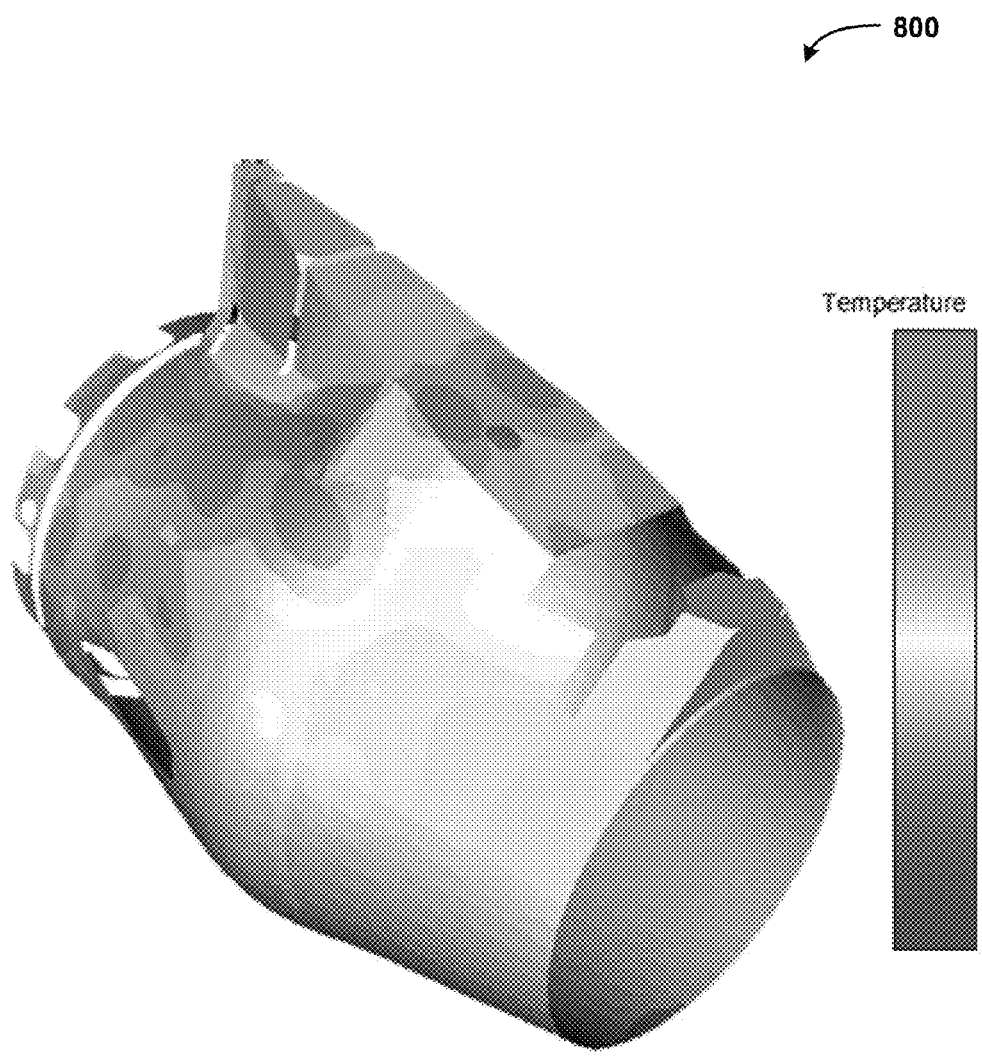
FIG. 8 illustrates a representation of sensor readings, according to an illustrative embodiment.

Although not shown in FIG. 7, the data 114 can be stored for any purposes, even if no alarms or alert conditions are detected. In one embodiment, the data 114 is stored and can be used for diagnostics or trending. In some embodiments, a thermal map can be generated from the stored data 114. An example of a thermal map 800 is illustrated in FIG. 8. As shown, the thermal map 800 can be generated as a thermal gradient produced by taking a matrix of sensor data and plotting the data in three-dimensional positions corresponding to positions of the associated sensors 200. The thermal map 800 thus can correspond to a visual representation of the undercowl environment. The thermal map 800 can be a significant tool for maintenance action and diagnostics and is not attainable with previous sensor systems.

Figure 9:
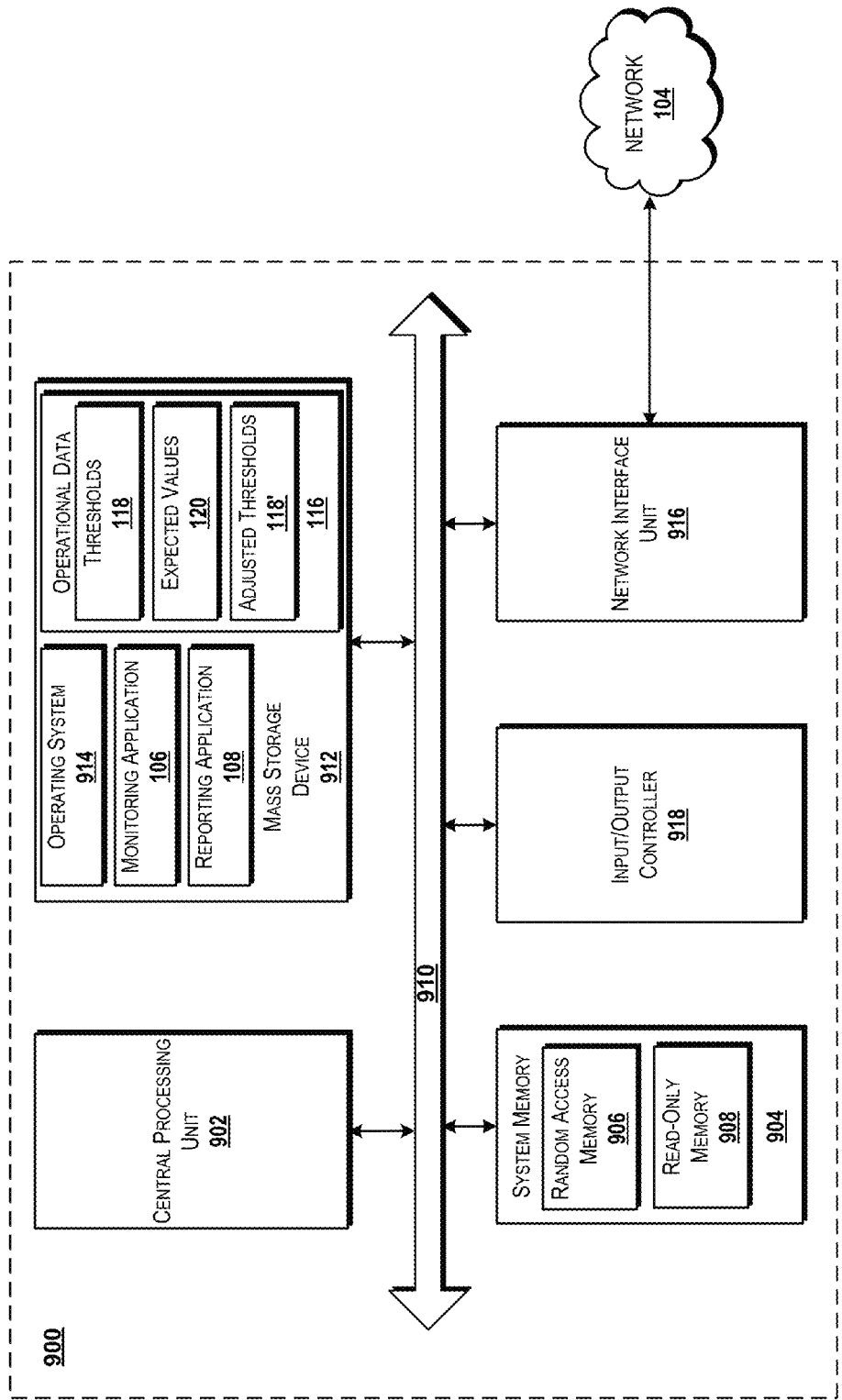
FIG. 9 is system diagram showing a computer architecture for a monitoring system, according to an illustrative embodiment.

FIG. 9 shows an illustrative computer architecture 900 of a monitoring system 102 capable of executing the software components described herein for detecting, monitoring, analyzing, and acting on data 114 obtained with the sensors 200, 200', 200", 200'" and/or the integrated sensor system 112 as presented herein is shown, according to one embodiment. As explained above, the monitoring system 102 may be embodied in a single computing device or in a combination of one or more processing units, storage units, and/or other computing devices implemented in the avionics systems of the aircraft and/or a computing system of an off-board computing system. The computer architecture 900 includes one or more central processing units 902 ("CPUs"), a system memory 904 that includes a random access memory 906 ("RAM") and a read-only memory 908 ("ROM"), and a system bus 910 that couples the memory to the CPUs 902.

The CPUs 902 may be standard programmable processors that perform arithmetic and logical operations necessary for the operation of the computer architecture 900. The CPUs 902 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 900 also includes a mass storage device 912. The mass storage device 912 may be connected to the CPUs 902 through a mass storage controller (not shown) further connected to the bus 910. The mass storage device 912 and its associated computer-readable media provide non-volatile storage for the computer architecture 900. The mass storage device 912 may store an operating system 914, various avionics systems and control systems, as well as specific application modules or other program modules, such as the monitoring application 106, the reporting application 108, and/or other programs or modules described above with reference to FIG. 1. The mass storage device 912 also may store data collected or utilized by the various systems and modules including, but not limited to, the operational data 116, which can include the thresholds 118, the adjusted thresholds 118', the expected values 120, and/or other data. Although not shown in FIG. 9, the mass storage device 912 also can store the data 114 and/or the adjusted data values 114'.

The computer architecture 900 may store programs and data on the mass storage device 912 by transforming the physical state of the mass storage device to reflect the information being stored. The specific transformation of physical state may depend on various factors, in different implementations of this disclosure. Examples of such factors may include, but are not limited to, the technology used to implement the mass storage device 912, whether the mass storage device is characterized as primary or secondary storage, and the like. For example, the computer architecture 900 may store information to the mass storage device 912 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 900 may further read information from the mass storage device 912 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 900. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. As used herein and in the claims, the phrase "computer storage medium" does not include transitory computer media such as propagated waves or signals, per se.

According to various embodiments, the computer architecture 900 may operate in a networked environment using logical connections to other avionics in the aircraft and/or to systems off-board the aircraft, which may be accessed through a network such as the network 104. The computer architecture 900 may connect to the network 104 through a network interface unit 916 connected to the bus 910. It should be appreciated that the network interface unit 916 may also be utilized to connect to other types of networks and remote computer systems. The computer architecture 900 also may include an input-output controller 918 for receiving input and providing output to aircraft terminals and displays, such as an in-flight display, maintenance access terminal (MAT) or other systems or devices. The input-output controller 918 may receive input from other devices as well, including a primary flight display ("PFD"), an electronic flight bag ("EFB"), a head-up display ("HUD"), a keyboard, mouse, electronic stylus, or touch screen associated with an in-flight display or other systems or devices. Similarly, the input-output controller 918 may provide output to other displays, a printer, or other type of output device.

Based on the foregoing, it should be appreciated that concepts and technologies for an integrated sensor system for detecting, characterizing, monitoring, and analyzing data are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A system comprising a monitoring system configured to execute computer executable instructions stored in a memory to:
   obtain data from a sensor system comprising a plurality of sensors, wherein one or more of the plurality of sensors comprises a temperature sensor deposited onto at least one surface of a monitored structure, the temperature sensor comprising a first trace formed from a first thermocouple material, a second trace formed from a second thermocouple material, and at least one junction whereat the first trace and the second trace intersect, and wherein the data indicating an operating state is detected at the monitored structure by at least one of the plurality of sensors;
   obtain operational data comprising a threshold value for each of the plurality of sensors and an expected value for each of the plurality of sensors;
   adjust the thresholds based, at least partially, upon the operational data to obtain an adjusted threshold value;
   compare the sensed data value to the adjusted threshold; and
   determine if the monitored structure is operating in an alarm condition.

2. The system of claim 1, wherein the monitored structure comprises an aircraft propulsion system, and wherein the temperature sensor is integrated into at least one structure of the aircraft propulsion system.

3. The system of claim 1, wherein the temperature sensor is deposited using at least one of a plasma flame spray, anatomized jetted spray, or a screen print.

4. The system of claim 1, wherein the temperature sensor is printed onto a flexible substrate and the flexible substrate is attached to at least one surface of the monitored structure.

5. The system of claim 1, wherein the temperature sensor is printed onto a substrate and the substrate is attached to a surface of the monitored structure at a hot side of the structure.

6. The system of claim 1, wherein the temperature sensor is printed onto a substrate and the substrate is attached to a surface of the monitored structure at a cold side of the structure.

7. The system of claim 6, wherein the sensor further comprises an anemometer printed on the cold side of the structure, and wherein obtaining the data comprises obtaining a temperature reading obtained with the temperature sensor, adjusting the obtained temperature based, at least partially, upon data obtained from the anemometer, and estimating a temperature at a hot side of the structure based upon the data obtained from the temperature sensor and the anemometer.

8. The system of claim 1, wherein the monitoring system is further configured to execute computer executable instructions stored in the memory to:

generate an alarm, in response to determining that the structure is operating in the alarm condition;
provide the alarm to an alarm recipient; and
store the data in a data storage device.

9. The system of claim 8, wherein the alarm recipient comprises an operating crew.

10. The system of claim 1, wherein the alarm condition comprises an overheat condition.

11. The system of claim 1, wherein the alarm condition comprises a fire condition.

12. The system of claim 1, wherein the monitored structure comprises an aircraft engine structure formed from a panel comprising a plurality of hexagonally-profiled cells.

13. The system of claim 12, wherein the at least one of the plurality of sensors comprises a sensor printed on a substrate, and wherein the substrate is disposed within the panel and disposed as a septum within the panel.

14. The system of claim 12, wherein the at least one of the plurality of sensors comprises a sensor printed on a substrate, and wherein the substrate forms one surface of at least one of the hex cells of the panel or is attached to at least one surface of at least one of the hex cells of the panel.

15. A computer-implemented method for monitoring a structure, the method comprising computer-implemented operations for:
obtaining data from at least one of a plurality of temperature sensors on an operating state of the structure, wherein the plurality of temperature sensors are integrated onto at least one surface of a structure by printing onto the at least one surface of the structure;
obtaining operational data comprising a threshold value for the at least one of the plurality of temperature sensors;
adjusting the threshold based, at least partially, upon the operational data to obtain an adjusted threshold value, wherein adjusting the thresholds comprises:
obtaining an ambient temperature at the monitored structure,
obtaining a thrust adjustment associated with the at least one of the plurality of sensors, and
adjusting the thresholds based, at least partially, upon the ambient temperature and the thrust adjustment to obtain the adjusted threshold value;
comparing the data value to the adjusted threshold; and
determining if the structure is operating in an alarm condition.

16. The method of claim 15, wherein the monitored structure comprises an aircraft propulsion system, and wherein each of the plurality of temperature sensors comprises a thermocouple.

17. The method of claim 15, further comprising storing the data in a data storage device in communication with the monitoring system.

18. A computer-implemented method for monitoring a structure, the method comprising:
obtaining data from at least one of a plurality of independently operating temperature sensors, wherein one or more of the plurality of independently operating temperature sensors are deposited onto the at least one surface of a monitored structure, the data indicating a temperature detected at the monitored structure;
obtaining operational data comprising a threshold value for the at least one of the plurality of temperature sensors;
adjusting the threshold based, at least partially, upon the operational data to obtain an adjusted data value;
comparing the data value to the adjusted threshold;
storing the data in a data storage device in communication with the monitoring system; and
presenting the data in a visual representation comprising a thermal map generated by plotting a matrix of sensor data in positions associated with the sensors.

19. The method of claim 18, wherein each of the temperature sensors is deposited onto a flexible substrate, and wherein each of the temperatures sensors is integrated into at least one component of the aircraft propulsion system by attaching the flexible substrate to at least one surface of an aircraft propulsion system.

20. The method of claim 18, wherein adjusting the thresholds comprises:
obtaining an ambient temperature at the aircraft;
obtaining a standard operating temperature of the aircraft;
obtaining a temperature adjustment by calculating a difference between the standard operating temperature of the aircraft and the ambient temperature;
obtaining a thrust adjustment associated with the at least one of the temperature sensors, the thrust adjustment comprising an expected rise in temperature based upon a percentage of a maximum thrust provided by the aircraft propulsion system when the data is obtained; and
adjusting the thresholds based, at least partially, upon the temperature adjustment and the thrust adjustment to obtain the adjusted threshold values.

21. The method of claim 19, wherein the flexible substrate is attached to a surface of the at least one component of an aircraft engine at a hot side of the at least one component of the aircraft engine.

22. The method of claim 19, wherein the flexible substrate is attached to a surface of the at least one component of an aircraft engine at a cold side of the at least one component of the aircraft engine.

23. The method of claim 22, wherein the temperature sensor further comprises an anemometer deposited on the cold side of the at least one component, and wherein obtaining the data comprises obtaining a temperature reading obtained with the temperature sensor, adjusting the obtained temperature based, at least partially, upon data obtained from the anemometer, and estimating a temperature at a hot side of the at least one component of the aircraft engine based upon the data obtained from the temperature sensor and the anemometer.

24. The method of claim 18, further comprising presenting the data in a visual representation.

25. The method of claim 24, wherein the visual representation comprises a thermal map generated by plotting a matrix of sensor data in positions associated with the sensors.

26. A system comprising a monitoring system configured to execute computer executable instructions stored in a memory to:
obtain data from a sensor system comprising a plurality of sensors, the data indicating an operating state detected at a monitored structure by at least one of the plurality of sensors, wherein one or more of the plurality of sensors comprises a panel, an insert cavity formed in the panel, and a panel insert configured to be selectively inserted into the insert cavity;
obtain operational data comprising a threshold value for each of the plurality of sensors and an expected value for each of the plurality of sensors;
adjust the thresholds based, at least partially, upon the operational data to obtain an adjusted threshold value;
compare the sensed data value to the adjusted threshold; and
determine if the monitored structure is operating in an alarm condition.

27. The system of claim 26, wherein the insert cavity further comprises at least one thermocouple formed therein, and wherein the one or more of the plurality of sensors is configured to measure a temperature at the monitored structure.

28. The system of claim 26, wherein the panel insert is configured to be inserted into the insert cavity from a cold side of the panel, and wherein the panel insert is configured to measure a condition at a hot side of the panel.

29. A system comprising a monitoring system configured to execute computer executable instructions stored in a memory to:
    obtain data from a sensor system comprising a plurality of sensors, the data indicating an operating state detected at a monitored structure by at least one of the plurality of sensors;
    obtain operational data comprising a threshold value for each of the plurality of sensors and an expected value for each of the plurality of sensors;
    adjust the thresholds based, at least partially, upon the operational data to obtain an adjusted threshold value by
        obtaining an ambient temperature at the monitored structure,
        obtaining a thrust adjustment associated with the at least one of the plurality of sensors, and
        adjusting the thresholds based, at least partially, upon the ambient temperature and the thrust adjustment to obtain the adjusted threshold value;
    compare the sensed data value to the adjusted threshold; and
    determine if the monitored structure is operating in an alarm condition.

30. A system comprising a monitoring system configured to execute computer executable instructions stored in a memory to:
    obtain data from a sensor system comprising a plurality of sensors, including obtaining a temperature with a temperature sensor of a plurality of sensors, the temperature sensor printed onto a substrate attached to a surface of a monitored structure at a cold side of the monitored structure;
    adjust the data, including the temperature obtained from the temperature sensor, based at least partially upon data obtained from an anemometer of the plurality of sensors, the anemometer printed on the cold side of the monitored structure;
    estimate a temperature at a hot side of the structure based upon the data obtained from the temperature sensor and the anemometer;
    obtain operational data comprising a threshold value for each of the plurality of sensors and an expected value for each of the plurality of sensors;
    adjust the thresholds based, at least partially, upon the operational data to obtain an adjusted threshold value;
    compare the obtained data to the adjusted threshold value; and
    in response to the comparison, determine if the monitored structure is operating in an alarm condition.

31. A system comprising a monitoring system configured to execute computer executable instructions stored in a memory to:
    obtain data from a sensor system comprising a plurality of sensors, wherein one or more of the plurality of sensors comprises a temperature sensor deposited onto at least one surface of a monitored structure, the data indicating an operating state detected at the monitored structure by at least one of the plurality of sensors, and wherein the monitored structure comprises an aircraft engine structure formed from a panel comprising a plurality of hexagonally-profiled cells;
    obtain operational data comprising a threshold value for each of the plurality of sensors and an expected value for each of the plurality of sensors;
    adjust the thresholds based, at least partially, upon the operational data to obtain an adjusted threshold value;
    compare the sensed data value to the adjusted threshold; and
    determine if the monitored structure is operating in an alarm condition.

32. The system of claim 31, wherein the at least one of the plurality of sensors comprises a sensor printed on a substrate, and wherein the substrate is disposed within the panel and disposed as a septum within the panel.

33. The system of claim 31, wherein the at least one of the plurality of sensors comprises a sensor printed on a substrate, and wherein the substrate forms one surface of at least one of the hex cells of the panel or is attached to at least one surface of at least one of the hex cells of the panel.

34. A computer-implemented method for monitoring a structure, the method comprising:
    obtaining data from at least one of a plurality of independently operating temperature sensors, wherein one or more of the plurality of independently operating temperature sensors are deposited onto the at least one surface of a monitored structure, the data indicating a temperature detected at the monitored structure;
    obtaining operational data comprising a threshold value for the at least one of the plurality of temperature sensors;
    adjusting the threshold based, at least partially, upon the operational data to obtain an adjusted data value, wherein adjusting the thresholds comprises:
        obtaining an ambient temperature at the aircraft,
        obtaining a standard operating temperature of the aircraft,
        obtaining a temperature adjustment by calculating a difference between the standard operating temperature of the aircraft and the ambient temperature,
        obtaining a thrust adjustment associated with the at least one of the temperature sensors, the thrust adjustment comprising an expected rise in temperature based upon a percentage of a maximum thrust provided by the aircraft propulsion system when the data is obtained, and
        adjusting the thresholds based, at least partially, upon the temperature adjustment and the thrust adjustment to obtain the adjusted threshold values;
    comparing the data value to the adjusted threshold; and
    storing the data in a data storage device in communication with the monitoring system.

35. A computer-implemented method for monitoring a structure, the method comprising:
    obtaining data from at least one of a plurality of independently operating temperature sensors, the data indicating a temperature detected at an aircraft engine, wherein each temperature sensor is deposited onto a flexible substrate attached to a surface of the at least one component of the aircraft engine at a cold side of the at least one component of the aircraft engine, wherein each temperature sensor further comprises an anemometer deposited on the cold side of the at least one component, and wherein obtaining the data comprises
        obtaining a temperature reading obtained with the temperature sensor, adjusting the obtained temperature based, at least partially, upon data obtained from the anemometer, and
estimating a temperature at a hot side of the at least one component of the aircraft engine based upon the data obtained from the temperature sensor and the anemometer;
obtaining operational data comprising a threshold value for the at least one of the plurality of temperature sensors;
adjusting the threshold based, at least partially, upon the operational data to obtain an adjusted data value;
comparing the data value to the adjusted threshold; and
storing the data in a data storage device in communication with the monitoring system.

* * * * *